(12) United States Patent
Liang et al.

(10) Patent No.: US 12,206,832 B2
(45) Date of Patent: Jan. 21, 2025

(54) METHOD AND SYSTEM FOR HIGH-SPEED DUAL-VIEW BAND-LIMITED ILLUMINATION PROFILOMETRY

(71) Applicant: INSTITUT NATIONAL DE LA RECHERCHE SCIENTIFIQUE, Québec (CA)

(72) Inventors: Jinyang Liang, Boucherville (CA); Cheng Jiang, Longueuil (CA); Patrick Kilcullen, Montreal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 0 days.

(21) Appl. No.: 17/444,307

(22) Filed: Aug. 3, 2021

(65) Prior Publication Data

US 2022/0038676 A1    Feb. 3, 2022

Related U.S. Application Data

(60) Provisional application No. 63/060,630, filed on Aug. 3, 2020.

(51) Int. Cl.
*H04N 13/254* (2018.01)
*G06T 7/521* (2017.01)
(Continued)

(52) U.S. Cl.
CPC .......... *H04N 13/254* (2018.05); *G06T 7/521* (2017.01); *G06T 7/557* (2017.01); *G06T 7/80* (2017.01);
(Continued)

(58) Field of Classification Search
CPC .... H04N 13/254; H04N 13/239; G01B 11/25; G06T 7/521; G06T 7/55; G06T 7/557
See application file for complete search history.

(56) References Cited

U.S. PATENT DOCUMENTS

| 2017/0084044 | A1* | 3/2017 | Keh | H04N 13/207 |
| 2018/0106593 | A1* | 4/2018 | Arden | G01B 11/002 |
| 2019/0303704 | A1* | 10/2019 | Cheng | H04N 13/122 |

OTHER PUBLICATIONS

Yin, et al., "High-speed 3D shape measurement using the optimized composite fringe patterns and stereo-assisted structured light system," Feb. 4, 2019, Optics Express, vol. 27, No. 3, pp. 2411-2431. (Year: 2019).*

(Continued)

*Primary Examiner* — Jayanti K Patel
*Assistant Examiner* — Christopher Kingsbury Glover
(74) *Attorney, Agent, or Firm* — Lavery, de Billy, L.L.P.; Gwendoline Bruneau

(57) ABSTRACT

A system and a method for high-speed dual-view band-limited illumination profilometry using temporally interlaced acquisition is disclosed. The method comprises using a projecting unit for projecting sinusoidal fringe patterns onto an object and capturing fringe patterns deformed by the object. A 3D image of the object is recovered pixel by pixel from partial images provided by a first camera and a second camera by locating a point in the images of the second camera that matches a selected pixel of the first camera. 3D coordinates and wrapped phase are then estimated based on a calibration of the cameras and determining an horizontal coordinate on the plane of a projector of the projecting unit based on a calibration of the projector, and using a wrapped phase value to recover a 3D point of 3D coordinates (x, y, z).

10 Claims, 18 Drawing Sheets

(51) Int. Cl.
  *G06T 7/557* (2017.01)
  *G06T 7/80* (2017.01)
  *H04N 13/239* (2018.01)
  *H04N 13/246* (2018.01)

(52) U.S. Cl.
  CPC ......... *H04N 13/239* (2018.05); *H04N 13/246* (2018.05)

(56) References Cited

OTHER PUBLICATIONS

Jiang, et al., "Real-time high-speed three-dimensional surface imaging using band-limited illumination profilometry with a CoaXPress interface," Feb. 15, 2020, Optics Letters vol. 45, No. 4, pp. 964-967. (Year: 2020).*
Zhang, et al., "Novel method for structured light system calibration," Aug. 2006, Optical Engineering, vol. 45(8), 083601. (Year: 2006).*
X. Su and Q. Zhang, "Dynamic 3-D shape measurement method: a review," Opt. Lasers Eng. 48, 191-204 (2010).
S. S. Gorthi and P. Rastogi, "Fringe projection techniques: whither we are?," Opt. Lasers Eng. 48, 133-140 (2010).
S. Van der Jeught and J. J. Dirckx, "Real-time structured light profilometry: a review," Opt. Lasers Eng. 87, 18-31 (2016).
S. Zhang, "Absolute phase retrieval methods for digital fringe projection profilometry: A review," Opt. Lasers Eng. 107, 28-37 (2018).
I. Ishii, K. Yamamoto, K. Doi, and T. Tsuji, "High-speed 3D image acquisition using coded structured light projection," In 2007 IEEE/RSJ International Conference on Intelligent Robots and Systems, (IEEE, 2007), 925-930.
J. Geng, "Structured-light 3D surface imaging: a tutorial," Adv. Opt. Photon. 3, 128-160 (2011).
J. Liang, M. F. Becker, R. N. Kohn, and D. J. Heinzen, "Homogeneous one-dimensional optical lattice generation using a digital micromirror device-based high-precision beam shaper," Journal of Micro/Nanolithography, MEMS, and MOEMS 11, 023002 (2012).
L. J. Hornbeck, "Digital light processing for high-brightness high-resolution applications," in Projection Displays III, (International Society for Optics and Photonics, 1997), 27-40.
J. Liang, S.-Y. Wu, R. N. Kohn, M. F. Becker, and D. J. Heinzen, "Grayscale laser image formation using a programmable binary mask," Opt. Eng. 51, 108201 (2012).
S. Lei and S. Zhang, "Flexible 3-D shape measurement using projector defocusing," Opt. Lett. 34, 3080-3082 (2009). Li, Y. Wang, J. Dai, W. Lohry, and S. Zhang, "Some recent advances on superfast 3D shape measurement with digital binary defocusing techniques," Opt. Lasers Eng. 54, 236-246 (2014).
B. Li, Y. Wang, J. Dai, W. Lohry, and S. Zhang, "Some recent advances on superfast 3D shape measurement with digital binary defocusing techniques," Opt. Lasers Eng. 54, 236-246 (2014).
C. Jiang, P. Kilcullen, X. Liu, J. Gribben, A. Boate, T. Ozaki, and J. Liang, "Real-time high-speed three-dimensional surface imaging using band-limited illumination profilometry with a CoaXPress interface," Opt. Lett. 45, 964-967 (2020).
Y. Wang and S. Zhang, "Superfast multifrequency phase-shifting technique with optimal pulse width modulation," Opt. Exp. 19, 5149-5155 (2011).
C. Zuo, Q. Chen, G. Gu, S. Feng, and F. Feng, "High-speed three-dimensional profilometry for multiple objects with complex shapes," Opt. Exp. 20, 19493-19510 (2012).
D. Li, H. Zhao, and H. Jiang, "Fast phase-based stereo matching method for 3D shape measurement," in 2010 International Symposium on Optomechatronic Technologies, (IEEE, 2010), 1-5.
C. Bräuer-Burchardt, C. Munkelt, M. Heinze, P. Kuhmstedt, and G. Notni, "Using geometric constraints to solve the point correspondence problem in fringe projection based 3D measuring systems," in International Conference on Image Analysis and Processing, (Springer, 2011), 265-274.
Z. Li, K. Zhong, Y. F. Li, X. Zhou, and Y. Shi, "Multiview phase shifting: a full-resolution and high-speed 3D measurement framework for arbitrary shape dynamic objects," Opt. Lett. 38, 1389-1391 (2013).
W. Yin, S. Feng, T. Tao, L. Huang, M. Trusiak, Q. Chen, and C. Zuo, "High-speed 3D shape measurement using the optimized composite fringe patterns and stereo-assisted structured light system," Opt. Exp. 27, 2411-2431 (2019).
B. Li, P. Ou, and S. Zhang, "High-speed 3D shape measurement with fiber interference," in Interferometry XVII: Techniques and Analysis, (International Society for Optics and Photonics, 2014), 920310.
N. L. Karpinsky, M. Hoke, V. Chen, and S. Zhang, "High-resolution, real-time three-dimensional shape measurement on graphics processing unit," Opt. Eng. 53, 024105 (2014).
C. Jiang, T. Bell, and S. Zhang, "High dynamic range real-time 3D shape measurement," Opt. Exp. 24, 7337-7346 (2016).
J.-S. Hyun and S. Zhang, "Superfast 3D absolute shape measurement using five binary patterns," Opt. Lasers Eng. 90, 217-224 (2017).
M. Unser, A. Aldroubi, and M. Eden, "Fast B-spline transforms for continuous image representation and interpolation," IEEE Transactions on Pattern Analysis & Machine Intelligence, 277-285 (1991).
X. Liu, J. Liu, C. Jiang, F. Vetrone, and J. Liang, "Single-shot compressed optical-streaking ultra-high-speed photography," Opt. Lett. 44, 1387-1390 (2019).
J. Liang, R. N. Kohn Jr, M. F. Becker, and D. J. Heinzen, "1.5% root-mean-square flat-intensity laser beam formed using a binary-amplitude spatial light modulator," Appl. Opt. 48, 1955-1962 (2009).
S. Zhang and P. S. Huang, "Novel method for structured light system calibration," Opt. Eng. 45, 083601 (2006).
J.-Y. Bouguet, "Camera Calibration Toolbox for Matlab", retrieved http://www.vision.caltech.edu/bouguetj/calib_doc/.
S. Zhang, D. Royer, and S.-T. Yau, "GPU-assisted high-resolution, real-time 3-D shape measurement," Opt. Exp. 14, 9120-9129 (2006).
R. Hartley and A. Zisserman, Multiple view geometry in computer vision (Cambridge university press, 2003).
W. Gao and Q. Kemao, "Parallel computing in experimental mechanics and optical measurement: A review," Opt. Lasers Eng. 50, 608-617 (2012).
J. Qian, M. Lei, D. Dan, B. Yao, X. Zhou, Y. Yang, S. Yan, J. Min, and X. Yu, "Full-color structured illumination optical sectioning microscopy," Scient. Rep. 5, 14513 (2015).
K. Dorozynska, V. Kornienko, M. Alden, and E. Kristensson, "A versatile, low-cost, snapshot multidimensional imaging approach based on structured light," Opt. Exp. 28, 9572-9586 (2020).
A. Ramos, F. Pelayo, M. Lamela, A. F. Canteli, C. Huerta, and A. Acios, "Evaluation of damping properties of structural glass panes under impact loading," in Cost Action TU0905 Mid-Term Conference on Structural Glass; Belis, J., Louter, C., Mocibob, D., Eds, 2013).
C. Bedon, M. Fasan, and C. Amadio, "Vibration analysis and dynamic characterization of structural glass elements with different restraints based on Operational Modal Analysis," Buildings 9, 13 (2019).
M. Haldimann, A. Luible, and M. Overend, Structural use of glass (Iabse, 2008), vol. 10.
S. Huang, K. Shinya, N. Bergstrom, Y. Yamakawa, T. Yamazaki, and M. Ishikawa, "Dynamic compensation robot with a new high-speed vision system for flexible manufacturing," Int. J. Adv. Manufact. Tech. 95, 4523-4533 (2018).
R. B. Randall, "State of the art in monitoring rotating machinery-part 1," Sound and vibration 38, 14-21 (2004).
T. A. Van Walsum, A. Perna, C. M. Bishop, C. P. Murn, P. M. Collins, R. P. Wilson, and L. G. Halsey, "Exploring the relationship between flapping behaviour and accelerometer signal during ascending flight, and a new approach to calibration," IBIS 162, 13-26 (2020).

(56) References Cited

OTHER PUBLICATIONS

D. Li, H. Zhao, and H. Jiang, "Fast phase-based stereo matching method for 30 shape measurement," in 2010 International Symposium on Optomechatronic Technologies, (IEEE, 2010), 1-5.
C. Brauer-Burchardt, C. Munkelt, M. Heinze, P. Kuehmstedt, and G. Notni, "Using geometric constraints to solve the point correspondence problem in fringe projection based 30 measuring systems," in International Conference on Image Analysis and Processing, (Springer, 2011), 265-274.
N. L. Karpinsky, M. Hoke, V. Chen, and S. Zhang, "High-resolution, real-time three-dimensional shape measurement on graphics processing unit," Optical Engineering 53, 024105 (2014).
C. Jiang, T. Bell, and S. Zhang, "High dynamic range real-time 30 shape measurement," Optics Express 24, 7337-7346 (2016).

\* cited by examiner

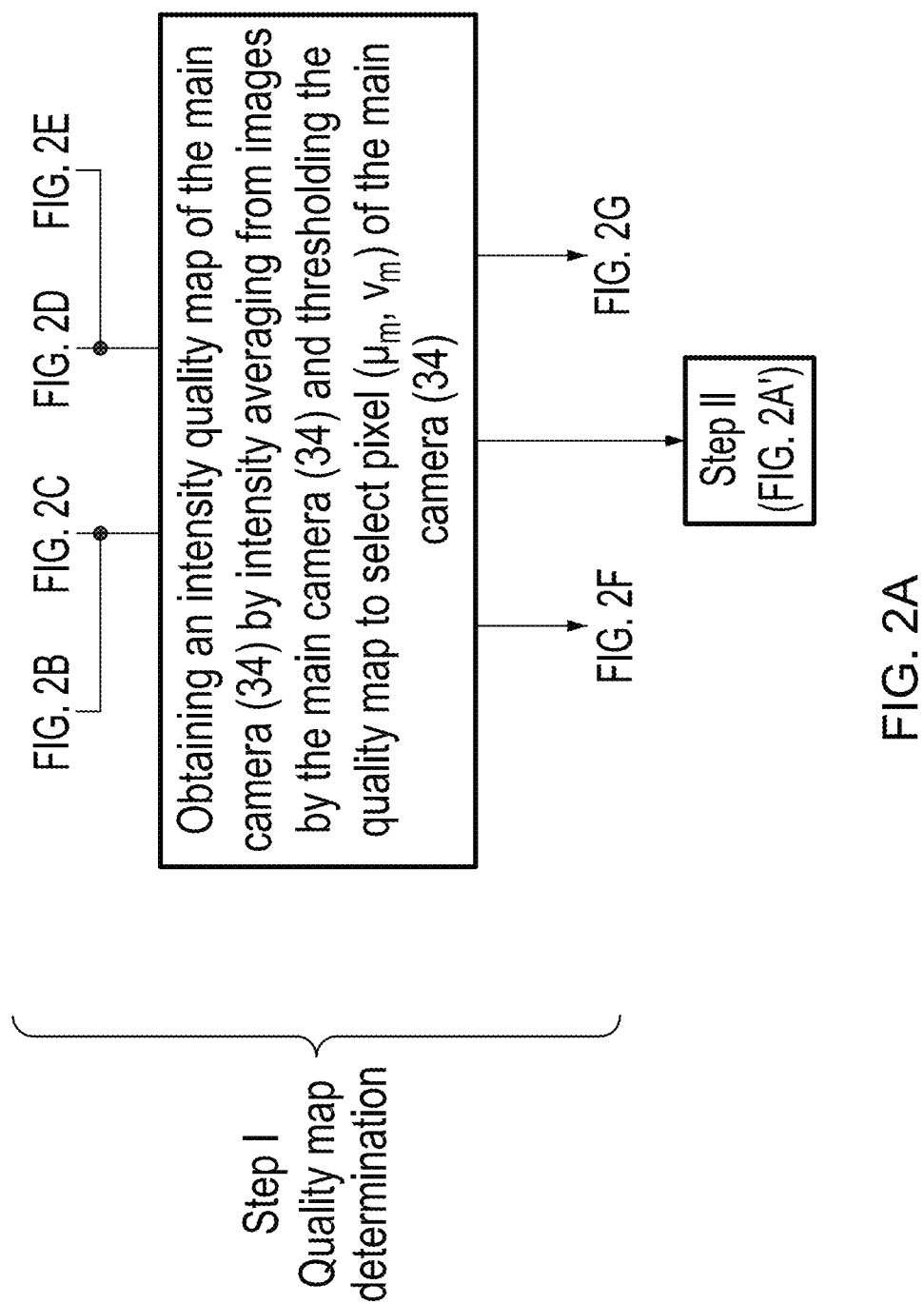

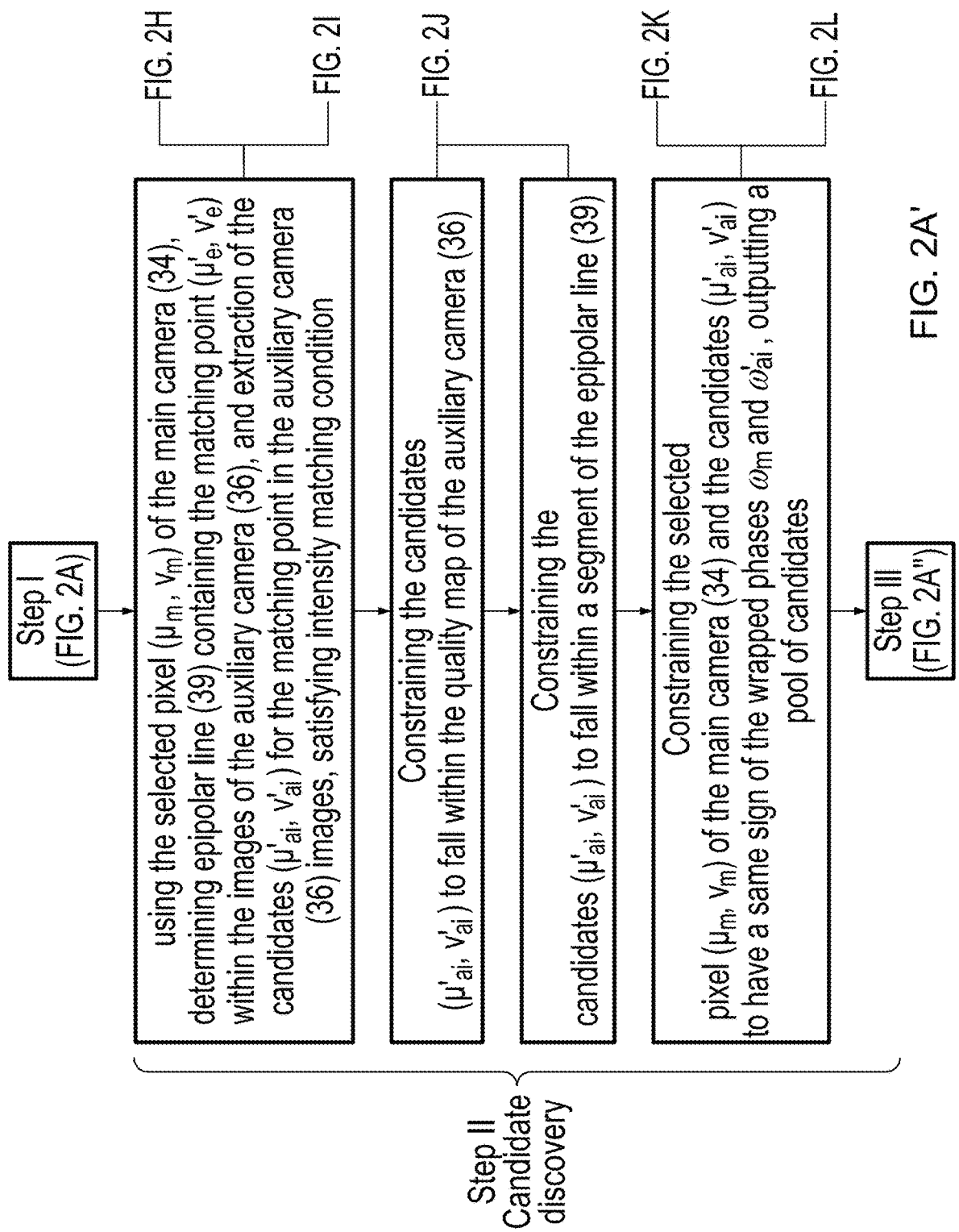

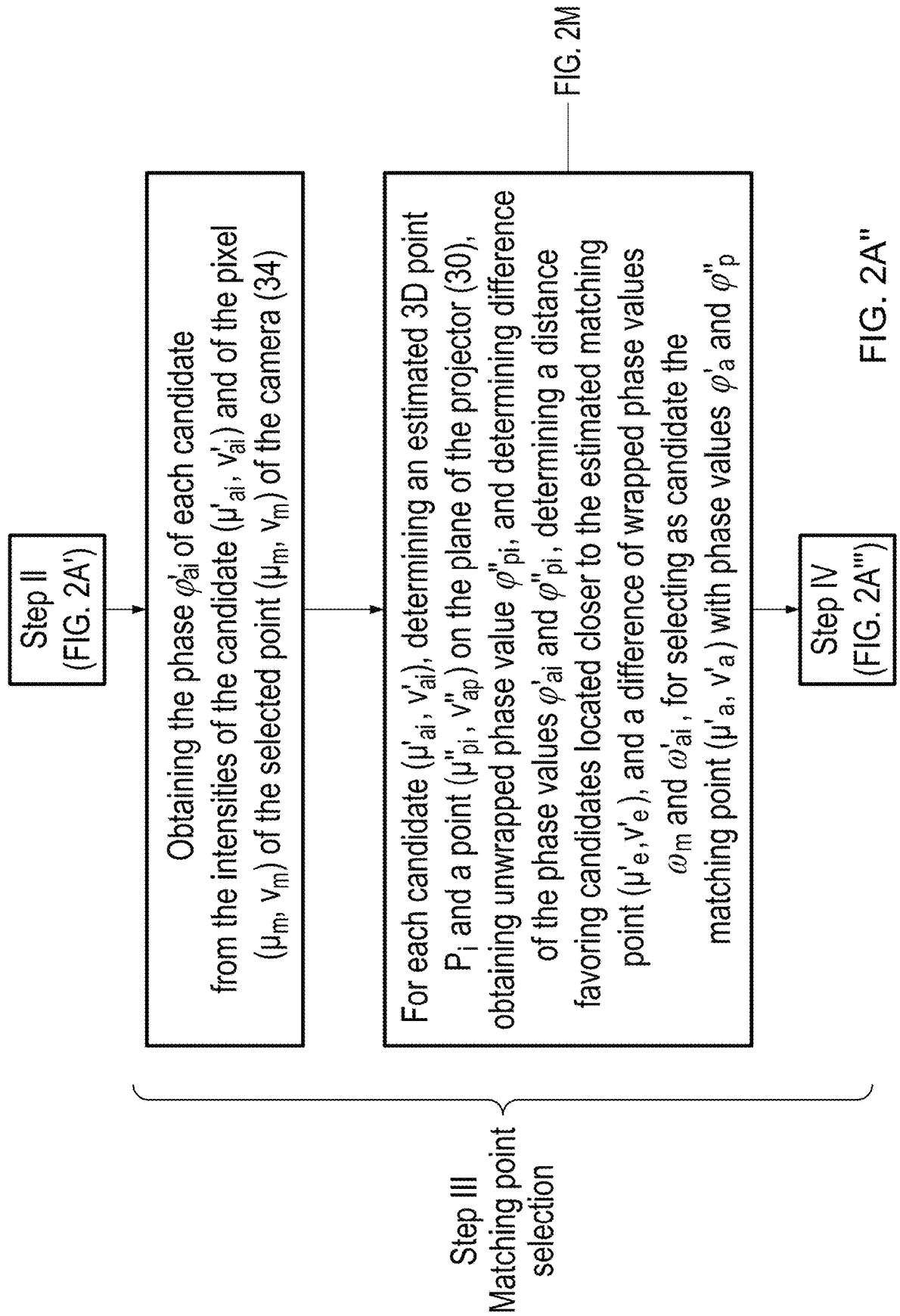

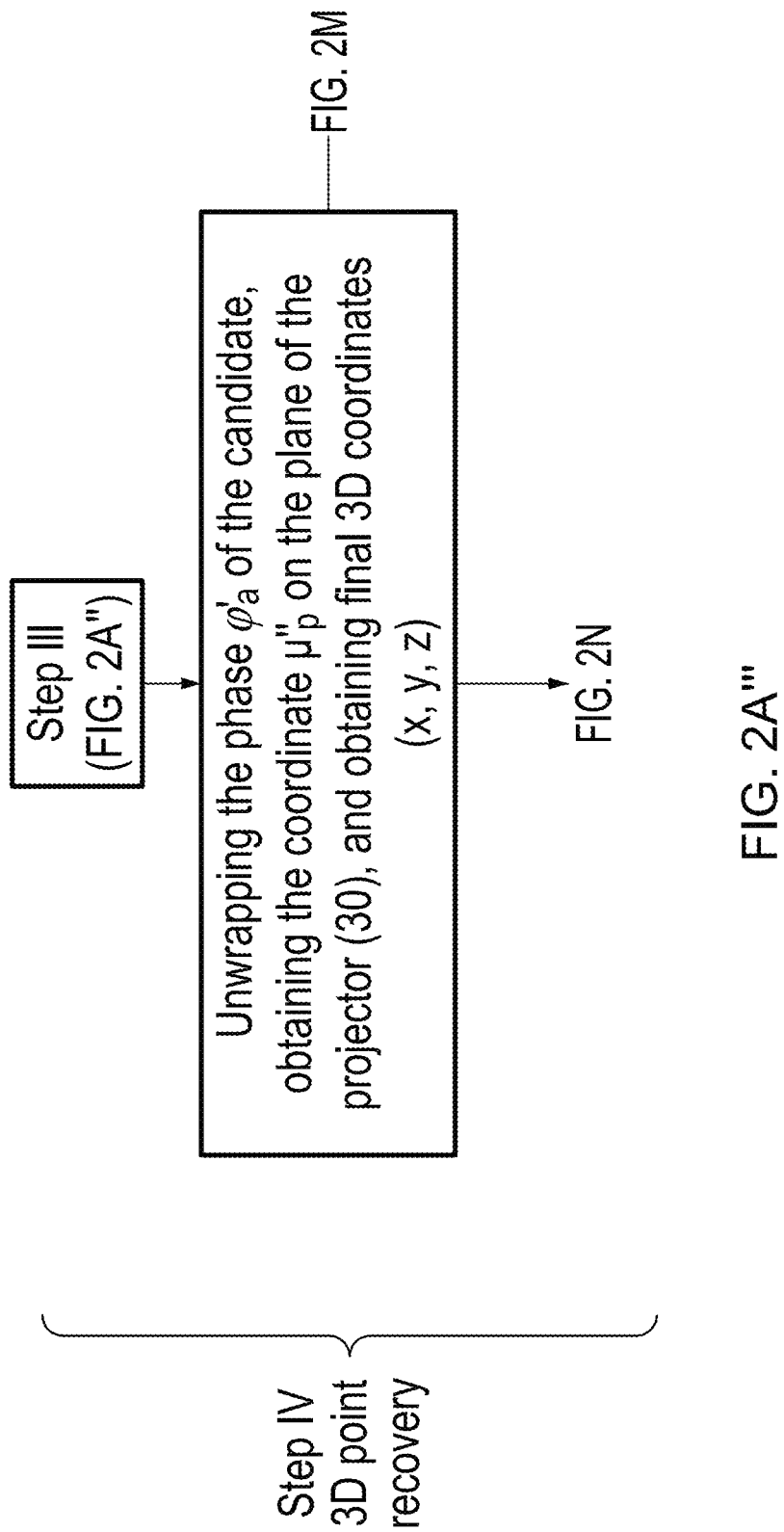

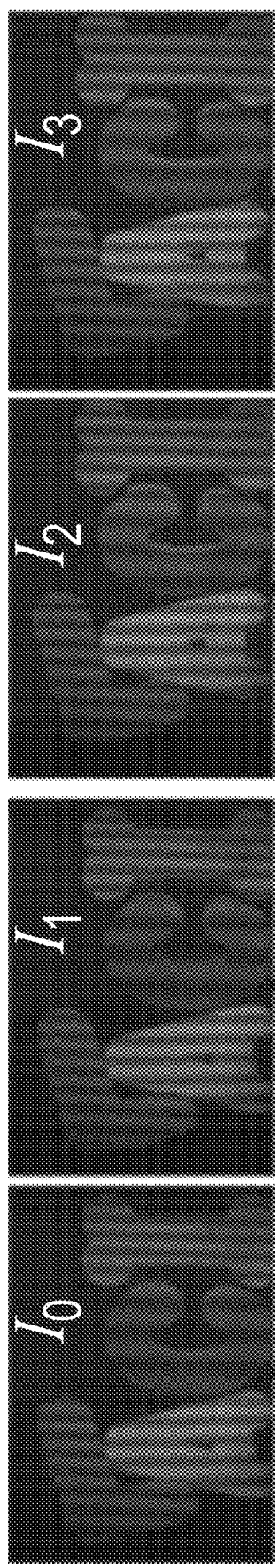
FIG. 2B LACI: letter toys
FIG. 2C LACI: letter toys
FIG. 2D LACI: letter toys
FIG. 2E LACI: letter toys

- Point to be matched $(u_m, v_m)$
- - Epipolar line (39)

LACI : letter toys

LACI : letter toys

Intensity profile of $I_3 - I_2$ along the epipolar line (39)

- Candidates (37)
- - Epipolar line (39)

LACI : letter toys $\Delta I_m = I_0(u_m, v_m) - I_1(u_m, v_m);$ $\Delta I_{ep}$: intensity profile of $I_3 - I_2$ along the epipolar line (39)

○ Selection range (41)
* Estimated corresponding point $(u'_e, v'_e)$
LACI : letter toys

* Point to be matched $(u_m, v_m)$
LACI : letter toys

Wrapped phase

* Estimated corresponding point $(u'_e, v'_e)$   ○ Selection range (41)
LACI : letter toys

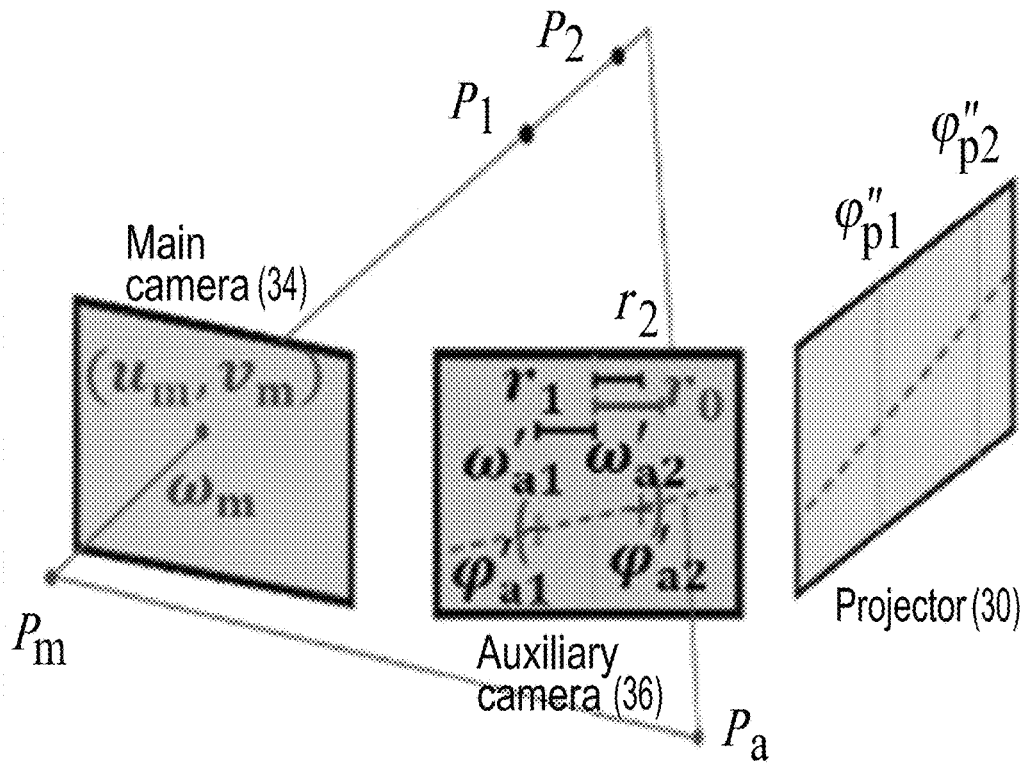

- Point to be matched $(u_m, v_m)$
- Candidates (37)
- - Epipolar line (39)
- Selection range (41)

$r_j$: horizontal distance between the candidates (37) and the estimated corresponding point $(u'_e, v'_e)$
$\omega_m$: phase value of the selected point $(u_m, v_m)$ in the main camera (34) obtained by the fourier transform profilometry
$\omega'_{aj}$: phase value of the candidates (37) in the auxiliary camera (36) obtained by the fourier transform profilometry
$\varphi'_{aj}$: phase value of the candidates (37) obtained by the phase-shifting method
$\varphi''_{pj}$: phase value of the candidates (37) determined on the plane of the projector (30)
$P_j$: 3D points determined by candidates (37)
$P_m$: principal point of the main camera (34)
$P_a$: principal point of the auxiliary camera (36)
$(u_m, v_m)$: selected pixel $(u_m, v_m)$ of the main camera (34)

FIG. 2M

Recovered 3D coordinates (x, y, z)
LACI : letter toys

Reconstructed 3D image of bouncing balls B1, B2, B3, at time points from 8 ms to 28 ms with a time interval of 5 ms

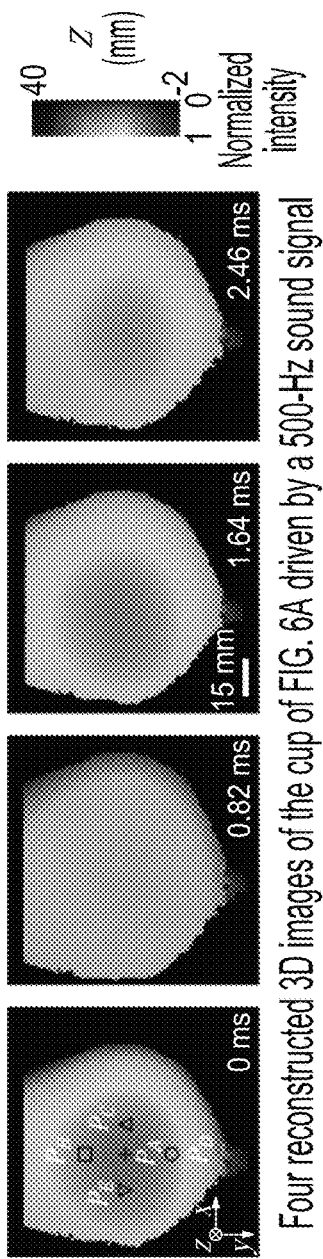

FIG. 6A

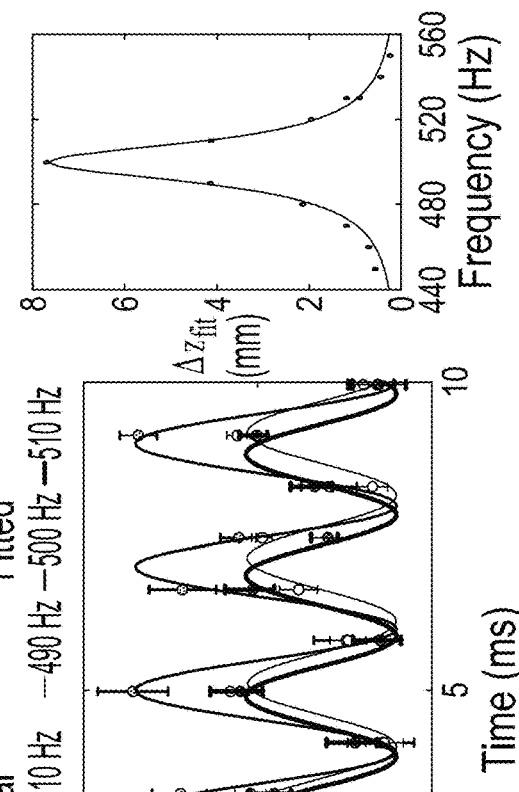

FIG. 6B

Four reconstructed 3D images of the cup of FIG. 6A driven by a 500-Hz sound signal

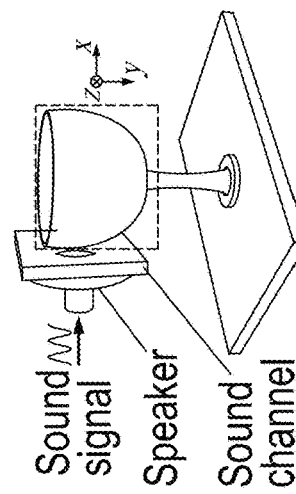

FIG. 6C

Evolution of the depth change of five points $P_A$, $P_B$, $P_C$, $P_D$, $P_E$ marked in of FIG. 6b

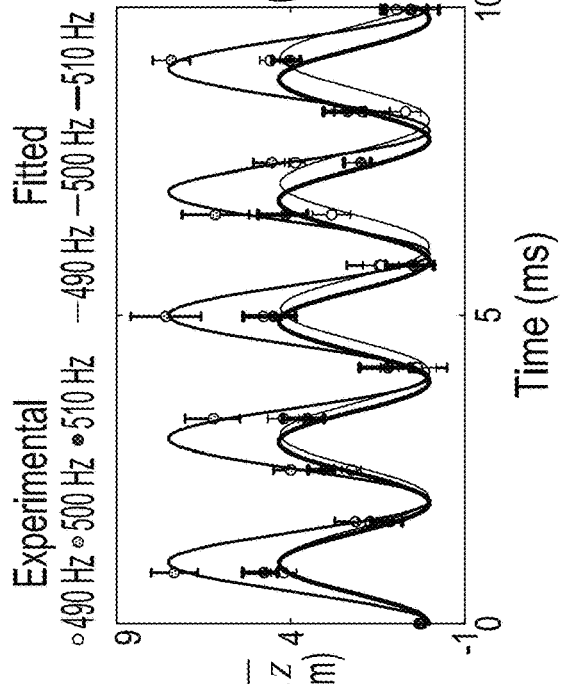

FIG. 6D

Evolution of the averaged depth change with the fitted results under driving frequencies of 490 Hz, 500 Hz, and 510 Hz; error bar: standard from deviation of $\Delta z$ calculated from the five selected pixels

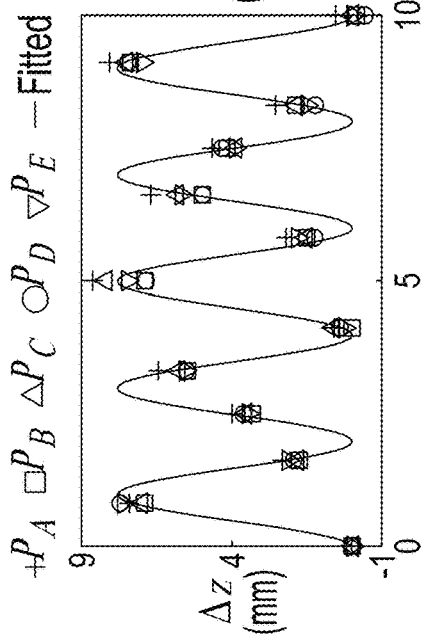

FIG. 6E

Response of the depth displacements to sound frequencies

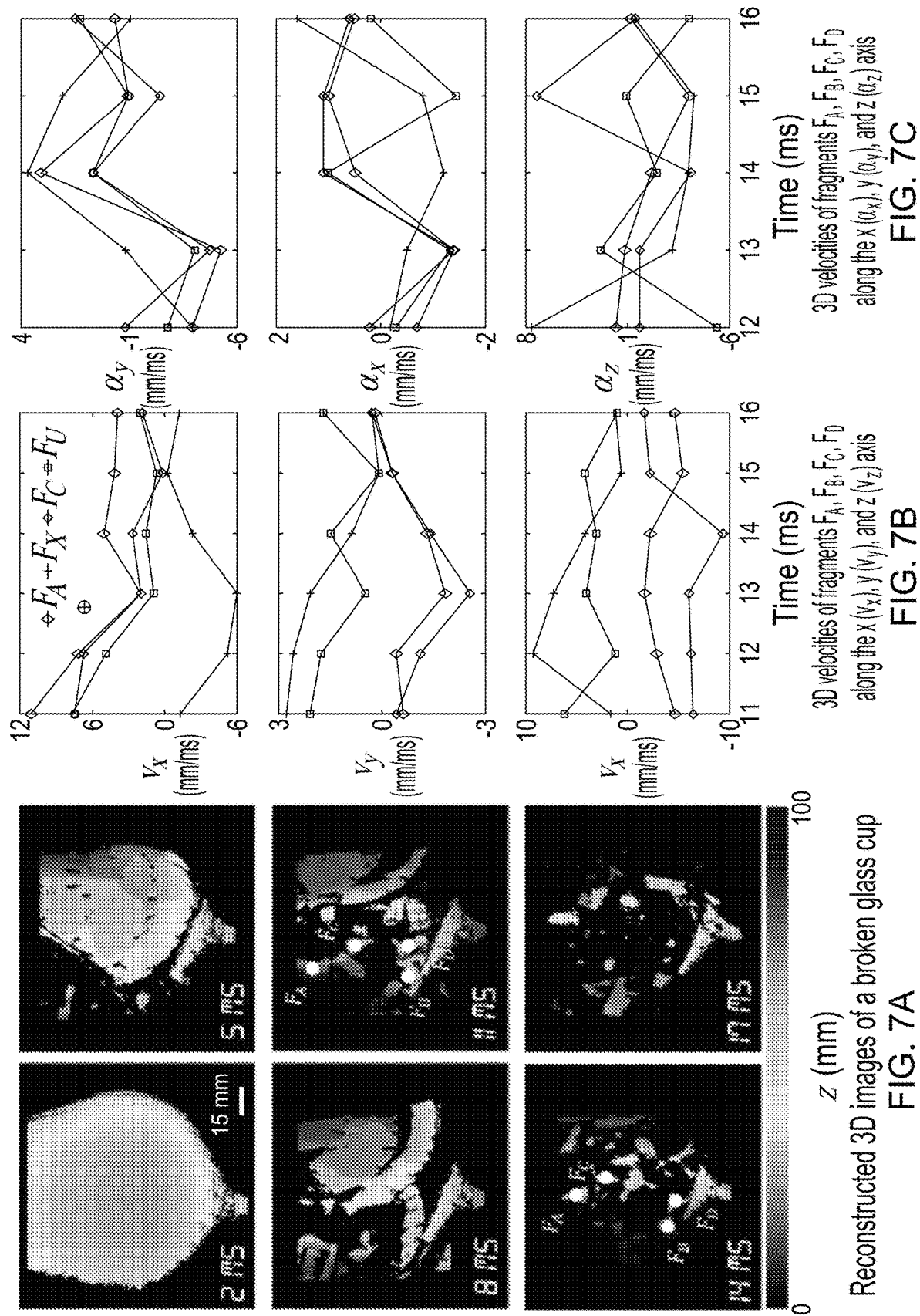

METHOD AND SYSTEM FOR HIGH-SPEED DUAL-VIEW BAND-LIMITED ILLUMINATION PROFILOMETRY

FIELD OF THE INVENTION

The present invention relates to three-dimensional imaging. More specifically, it is concerned with a system and a method for high-speed dual-view band-limited illumination profilometry.

CROSS REFERENCE TO RELATED APPLICATIONS

This application claims benefit of U.S. provisional application Ser. No. 63/060,630, filed on Aug. 3, 2020. All documents above are incorporated herein in their entirety by reference.

BACKGROUND OF THE INVENTION

Three-dimensional (3D) surface imaging has been extensively applied in a number of fields in industry, entertainment, and biomedicine. Among developed methods, structured-light profilometry has gained increasing popularity in measuring dynamic 3D objects due to high measurement accuracy and high imaging speeds. Phase-shifting fringe projection profilometry (PSFPP) for instance uses a set of sinusoidal fringe patterns as the basis for coordinate encoding, and, in contrast to other methods such as binary pattern projection for example, the pixel-level information carried by the phase of the fringe patterns is insensitive to variations in reflectivity across the surface of the object's surface, which results in high accuracy in 3D measurements. The sinusoidal fringes are typically generated using digital micromirror devices (DMDs). Each micromirror on the digital micromirror devices can be independently tilted to either +12° or −12° from the normal to its surface to generate binary patterns at up to tens of kilohertz. Although they are binary amplitude spatial light modulators, it was shown that digital micromirror devices can be used to generate grayscale fringe patterns at high speeds. The average reflectance rate of each micromirror can be controlled by conventional dithering method to form a grayscale image. However, the projection rate of fringe patterns is limited at hundreds of hertz. To improve the projection speed, binary defocusing methods have been developed to produce a quasi-sinusoidal pattern by slightly defocusing a single binary digital micromirror device pattern. Nonetheless, the image is generated at a plane unconjugated to the digital micromirror device, which compromises the depth-sensing range and is less convenient to operate with fringe patterns of different frequencies. Recently, band-limited illumination was developed to control the system bandwidth by placing a pinhole low-pass filter at the Fourier plane of a 4 f imaging system. Both the binary defocusing method and the band-limited illumination scheme allow generating one grayscale sinusoidal fringe pattern from a single binary digital micromirror device pattern. Thus, the fringe projection speed matches the refreshing rate of the digital micromirror device.

High-speed image acquisition is indispensable to digital micromirror device-based phase-shifting fringe projection profilometry. In standard phase-shifting fringe projection profilometry methods, extra calibration patterns must be used to avoid phase ambiguity, which reduces the overall 3D imaging speed. A solution to this problem is to use multiple cameras to simultaneously capture the full sequence of fringe patterns. The enriched observation of the 3D object eliminates the necessity of calibration patterns in data acquisition and phase unwrapping. This advancement, along with the incessantly increasing imaging speeds of cameras, has endowed multi-view phase-shifting fringe projection profilometry systems with image acquisition rates that keep up with the refreshing rates of digital micromirror devices.

Current multi-view phase-shifting fringe projection profilometry systems are still limited, mainly in two aspects. First, each camera must capture the full sequence of fringe patterns. This requirement imposes redundancy in data acquisition, which ultimately clamps the imaging speeds of systems. Given the finite readout rates of camera sensors, a sacrifice of the field of view (FOV) is inevitable for higher imaging speeds. Advanced signal processing approaches, such as image interpolation and compressed sensing, applied to mitigate this trade-off typically involve high computational complexity and reduced image quality. Second, generally the cameras are placed on different sides of the projector, and this arrangement may induce a large intensity difference from the directional scattering light and the shadow effect from the occlusion by local surface features, both of which reduce the reconstruction accuracy and exclude the application from non-Lambertian surfaces.

There is a need in the art for a method and a system for high-speed dual-view band-limited illumination profilometry.

SUMMARY OF THE INVENTION

More specifically, in accordance with the present invention, there is provided a system for 3D imaging of an object, the system comprising a projection unit and at least two cameras; the projection unit comprising a light source and a projector; the cameras being positioned on a same side of the projector; wherein the projection unit projects sinusoidal fringe patterns onto the object and the cameras alternatively capture, point by point, fringe patterns deformed by the object, depth information being encoded into the phase of the deformed fringe patterns, and the object being recovered by phase demodulation and reconstruction.

There is further provided a method for 3D imaging of an object, comprising projecting sinusoidal fringe patterns onto the object using a projecting unit and capturing fringe patterns deformed by the object, alternatively by at least a first camera and a second camera, and recovering a 3D image of the object pixel by pixel from mutually incomplete images provided by the first camera and the second camera, by locating a point in images of the second camera that matches a selected pixel of the first camera; determining estimated 3D coordinates and wrapped phase based on calibration of the cameras, determining an horizontal coordinate on the plane of a projector of the projecting unit based on calibration of the projector, and using a wrapped phase value to recover a 3D point of 3D coordinates (x, y, z).

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 2A is a flow chart of a quality map determination step (Step I), FIG. 2A' is a flow chart of a candidate discovery step (Step II), FIG. 2A" is a flow chart of a matching point selection step (Step III) and FIG. 2A''' is a flow chart of a 3D point recovery step (see Step IV), of a coordinate-based 3D point determination method, with illustrative data according to an embodiment of an aspect of the present invention: FIGS. 2B-2E show images obtained by the main camera (34) (intensities $I_0, I_1, I_2, I_3$), FIG. 2M shows the selected pixel ($u_m, v_m$) with phase value $\omega_m$ in the plane of the main camera (34), the selection range (41) for the candidates (37) distanced by $r_i$, the phase value $w'_{ai}$ calculated by the Fourier transform profilometry method, the phase value $\varphi'_{ai}$ calculated by the phase-shifting method in the plane of the auxiliary camera (36), and the phase value $\varphi''_{pi}$ I sdetermined on the plane of the projector (30)

FIG. 6A is a schematic view of an experimental setup of a glass cup fixed on a table; the field of view being marked by the dashed box;

FIG. 6B shows four reconstructed 3D images of the cup of FIG. 6A driven by a 500-Hz sound signal;

FIG. 6C shows evolution of the depth change of five points marked by $P_A$ to $P_E$ in the first panel of FIG. 6B with fitted result (curve in straight line);

FIG. 6D shows evolution of the averaged depth change with fitted results (curves in straight lines) under driving frequencies of 490 Hz, 500 Hz, and 510 Hz; error bar: standard deviation of Δz calculated from the five selected points $P_A$ to $P_E$;

FIG. 6E shows the response of the depth displacements to sound frequencies using the amplitudes of fitted results $\Delta z_{fit}$, the curve being a fitted result of a Lorentz function, determining a resonance frequency of the glass cup at 499.0 Hz;

FIG. 7A shows six reconstructed 3D images showing a glass cup broken by a hammer;

FIG. 7B shows the evolution of 3D velocities, in the x-axis ($v_x$), the y-axis ($v_y$) and the z-axis ($v_z$), of four selected fragments, marked by $F_A$ to $F_D$ in the fourth and fifth panels in FIG. 7A; and FIG. 7C shows the evolution of the corresponding 3D accelerations $\alpha_x, \alpha_y, \alpha_z$ of the four selected fragments $F_A$ to $F_D$.

DESCRIPTION OF ILLUSTRATIVE EMBODIMENTS

The present invention is illustrated in further details by the following non-limiting examples.

A system for band-limited illumination profilometry (BLIP) with temporally interlaced acquisition (TIA) according to an embodiment of an aspect of the present invention generally comprises a projection unit to project pre-defined fringe patterns onto the surface of the measured object, the fringe patterns being distorted and reflected by the object surface, point by point, and cameras capturing the distorted fringes images, point by point.

Figure 1A:
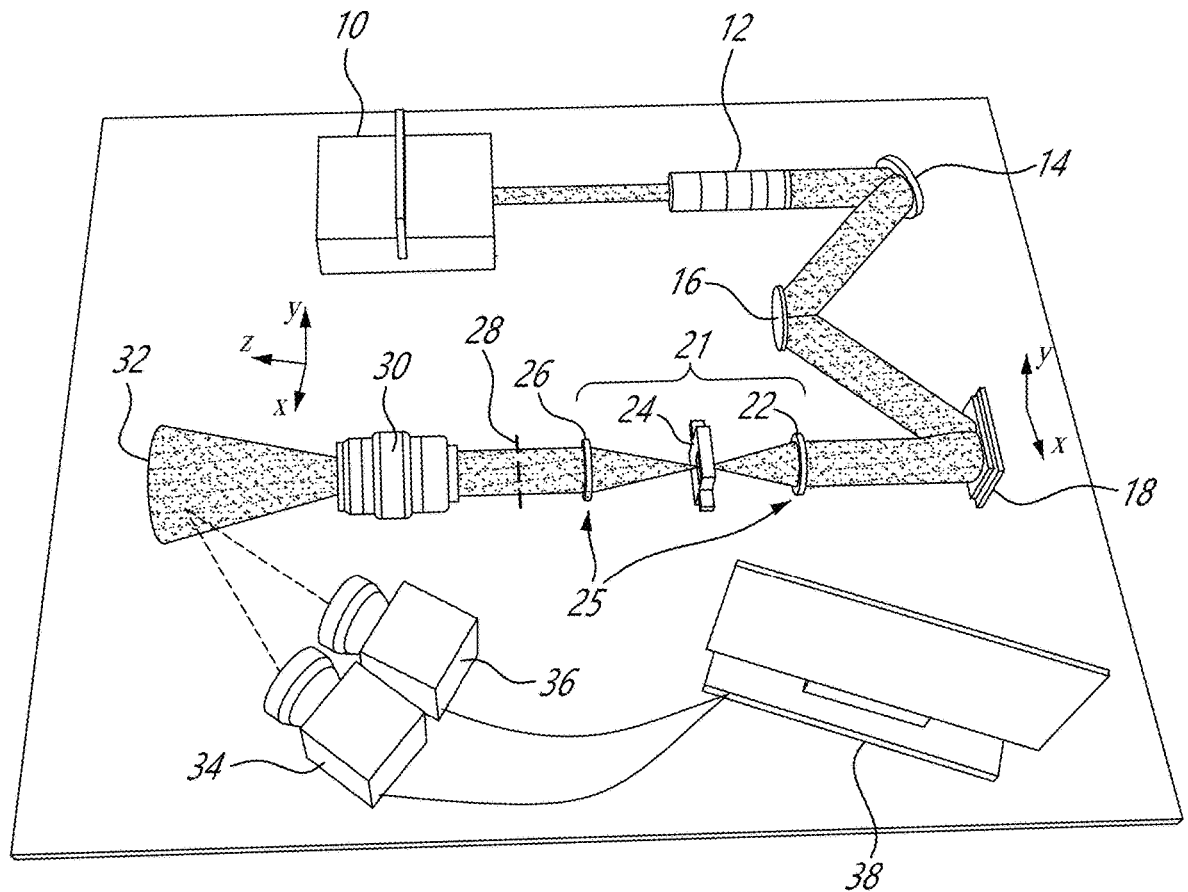
FIG. 1A is a schematic view of a system according to an embodiment of an aspect of the present invention.

In FIG. 1A, the projecting unit comprises a high-coherent light source 10, a spatial light modulator 18, a pattern conversion unit 21, a projecting optics 30.

After expansion and collimation by a beam expander 12, the laser beam from a 10 lns a 200-mW continuous-wave laser source 10, of wavelength λ=671 nm (MRL-III-671, CNI Lasers), is directed by mirrors 14 and 16 to a 0.45" Digital Micromirror Device (or DMD) 18 (AJD-4500, Ajile Light Industries) at an incident angle of about 24° to the normal of the surface of the Digital Micromirror Device 18, for sinusoidal fringes generation; using four phase-shifting binary patterns $I_0, I_1, I_2, I_3$, generated by an error diffusion algorithm from their corresponding grayscale sinusoidal patterns, loaded onto the Digital Micromirror Device 18. The pattern conversion unit 21, comprising a 4 f imaging system 25 with a low pass filter 24 such as a pinhole, converts the binary patterns to grayscale fringes at the intermediate image plane 28.

The minimal pinhole diameter D for all spatial frequency content of the sinusoidal fringe pattern to pass through the system is determined by the system bandwidth as follows:

$$D = \frac{\lambda f_1}{p_f} \tag{1}$$

where $p_f=324$ µm is the period of the fringes composed by the digital micromirror device pixels, $f_1$ being the focal length of lens 22. With lenses 22 and 26 of the 4 f imaging system 25 having focal lengths $f_1=120$ mm and $f_2=175$ mm respectively, the minimal pinhole diameter is D=248.52 µm. In an experiment, a 300 µm-diameter pinhole was selected.

A projector lens/projector 30 (AF-P DX NIKKOR, Nikon) projects the output fringe patterns 31 on a 3D object 32.

Deformed structured images are captured alternately by two high-speed CMOS cameras 34, 36 (CP70-1HS-M-1900, Optronis) placed side by side, i.e on a same side of the projector. Depending on their roles in image reconstruction, the cameras are referred to as the main camera 34 and the auxiliary camera 36 respectively, as will be described hereinbelow. Synchronized by the trigger signal of the digital micromirror device, each camera 34, 36 captures half of the sequence (FIG. 1B: Capture $I_0$ of fringe pattern intensity $I_0$ and Capture $I_1$ of fringe pattern intensity $I_1$: Capture $I_2$ of fringe pattern intensity $I_2$ and Capture $I_3$ of fringe pattern intensity $I_3$ respectively, etc., for exposure time $t_e$). The acquired images from each camera are transferred to a computer 38 via a CoaxPress cable connected to a frame grabber (Cyton-CXP, Bitflow).

The light source 10 is a high coherent light source of power at least 50 mW, selected depending on the sensitivity of cameras 34 and 36. with a laser wavelength is comprised in the range between about 380 and about 750 nm in case of visible light cameras, and in the range between about 800 and about 1100 nm in case of near infrared (NIR) cameras.

The high-speed cameras 34, 36 may be cameras with global shutter, of imaging speed of at least about 2 k frames/second, with image resolution at least about 1000× 800 pixels.

The spatial light modulator 18 has a refreshing rate of at least about 4 kHz, on board memory of at least about 1 Mb, and is selected to work at the corresponding wavelength of the light source. It may be a liquid crystal display or a binary fringe mask with a motorized translation stage for example.

The pattern conversion unit 21 may comprise a 4 f imaging system 25 with lenses of different focal lengths and the low-pass filter 24 may be a slit. The focal lengths of the two lenses are selected with a ratio (focal length of the first lens/focal length of the second length) comprised in the range between about 0.75 and about 1.5. The diameter of the low pass filter is selected in the range between about 150 µm and about 300 µm.

The projecting optics/projector 30 is selected with a focal length in the range between about 18 and about 55 mm, a F number in the range between about 3.5 and about 5.6, and a magnification ratio in a range between about 5 and about 10 times.

The imaging speed and field of view may be further improved by using more than two cameras, in such a way to separate the workload to an array of cameras, for example to trace and recognize hand gesture in 3D space to provide information for human-computer interaction.

The system thus projects sinusoidal fringe patterns 31 onto the object 32 and captures the corresponding deformed patterns 37 modulated by the surfaces of the object 32. The depth information is encoded into the phase of the distorted fringe images 38. For phase demodulation and reconstruction of the 3D object, the retrieved phase distribution corresponding to the object height is mathematically wrapped to principle values of arctangent function ranging between $-\pi$ and $\pi$, and consequently, the phase discontinuities occur at the limits every time when the unknown true phase changes by $2\pi$, which is referred to as the phase ambiguity problem, resulting from the periodical nature of the sinusoidal signal. A unique pixel correspondence between the cameras 34, 36 and the projector 30 is obtained by phase unwrapping.

According to an aspect of the present disclosure, a method to recover the 3D image of the object 32 pixel by pixel from the mutually incomplete images provided by the cameras 34, 36 generally comprises locating a point $(u'_a, v'_a)$ in the images of the auxiliary camera 36 that matches a selected pixel $(u_m, v_m)$ of the main camera 34; determining estimated 3D coordinates and wrapped phase from knowledge of the cameras calibration, determining the horizontal coordinate on the plane of the projector from knowledge of the projector calibration, and using the wrapped phase value to recover the 3D point of 3D coordinates (x, y, z) with the coordinate-based method.

System Calibration

To recover the object's 3D information, the method relies on a coordinate-based understanding of the spatial relationship between the projector 30 and the cameras 34, 36 in image formation. The projection of the 3D coordinates (x, y, z) of the 3D point onto the camera coordinates (u, v) is described in a pinhole model using extrinsic parameters R and T describing the rotation and translation of coordinates, respectively, and intrinsic parameters characterizing the properties of the cameras in image formation, with $f_u$ and $f_v$ the effective focal lengths along each axis of the sensor of the cameras; $u_{pp}$ and $v_{pp}$ the coordinates of the principal point of the cameras; and a accounting for pixel skewness, as follows:

$$s \begin{bmatrix} u \\ v \\ 1 \end{bmatrix} = \begin{bmatrix} f_u & \alpha & u_{pp} \\ 0 & f_v & v_{pp} \\ 0 & 0 & 1 \end{bmatrix} [R\ T] \begin{bmatrix} x \\ y \\ z \\ 1 \end{bmatrix}, \qquad (2)$$

Column vectors $[u, v, 1]^T$ and $[x, y, z, 1]^T$ represent the camera coordinates (u, v) and the 3D coordinates (x, y, z) in homogeneous coordinates, which allow for the numerical extraction of the camera coordinates (u, v) from Relation (2) through a scalar factor s.

The cameras 34, 36 and the projector 30 are calibrated to determine the values of the extrinsic and intrinsic parameters using a checkerboard (not shown). Since the direct image acquisition is not possible for a projector 30, projector-centered images of the calibration object obtained by the phase-based mapping method are sent to a toolbox (also not shown) with calibration in the same manner as for the cameras 34, 36.

Coordinate-Based 3D Point Determination 3D information is recovered from the calibrated imaging system using a coordinate-based method. To a point on the 3D object with the 3D coordinates (x, y, z) correspond two independent coordinates, (u, v) for the cameras 24, 36 and (u", v") for the projector 30.

In a calibrated phase-shifting fringe projection profilometry system, any three of these coordinates {u, v, u", v"} can be determined and a linear system of the form $E=M[x, y, z]^T$ is derived. The elements of E and M are obtained by using the calibration parameters of each device, the scalar factors and the three determined coordinates among u, v, u" and v". Thus, 3D information of an object point can be extracted via matrix inversion.

Returning to the system discussed in relation to FIG. 1A, first, images from the calibrated main camera 34 are used to provide the camera coordinates (u, v) of a point on the 3D object. Along with the calibration parameters of the system, an epipolar line 39 is determined on the calibrated auxiliary camera 36. The horizontal coordinate in the images of the auxiliary camera 36 is recovered using search-based algorithms along the epipolar line 39, in stereo vision. Second, by substituting the calibrated projector in place of the auxiliary camera 36, the intensity values of the pixel (u, v) of the auxiliary camera 36 across a sequence of images is used by structured light methods to recover information about a coordinate of the calibrated projector. The object's 3D information is extracted pixel by pixel based on interlaced image acquisition by incorporating the camera coordinates (u, v) of a point on the 3D object and its corresponding projector coordinates, using a triangulation method to solve the point in 3D space.

Data Acquisition

For data acquisition, four fringe patterns with phases equally shifted by $\pi/2$ illuminate the 3D object. The intensity value $I_k(u, v)$ for the pixel (u, v) in the kth image acquired by the calibrated main camera 34 is obtained as follows:

$$I_k(u, v) = I_b(u, v) + I_{va}(u, v)\cos\left[\varphi(u, v) - \frac{\pi k}{2}\right], \quad (3)$$

where $k \in [0,3]$. $I_b(u, v)$ is the background intensity, $I_{va}(u, v)$ is the variation of intensity and $\varphi(u, v)$ is the depth-dependent phase.

Figure 1B:
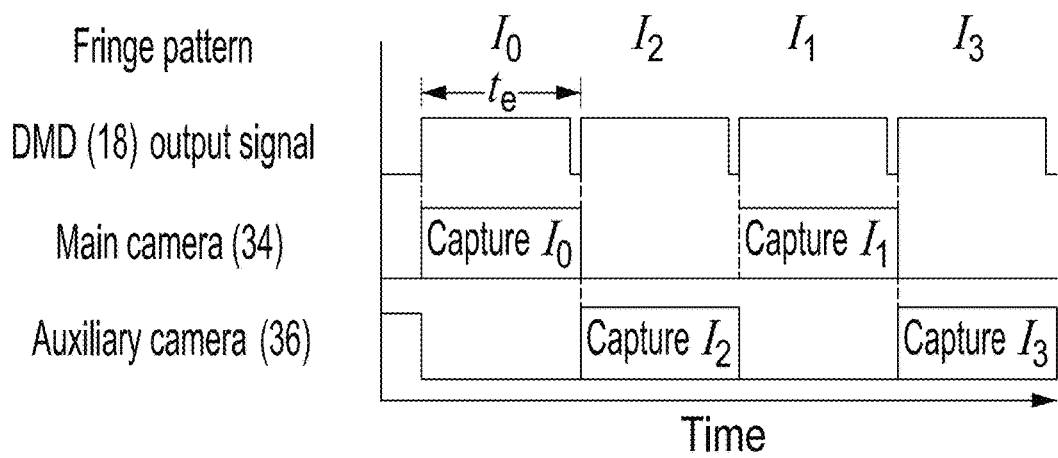
FIG. 1B shows a timing diagram and acquisition sequence where, synchronized by the trigger signal of the spatial light modulator (18), each camera (34), (36) of the system of FIG. 1A captures half of the sequence: Capture of fringe pattern intensity $I_0$ and Capture of fringe pattern intensity, for exposure time $t_e$.
Figure 2F:
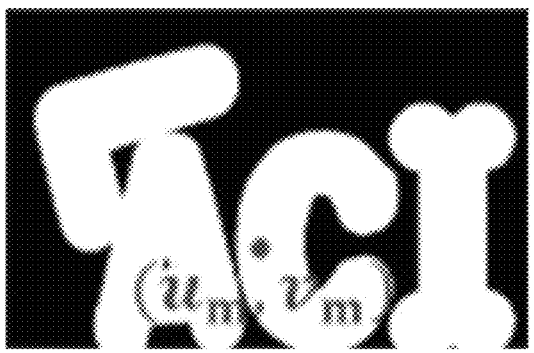
FIG. 2F shows the selected pixel ($u_m, v_m$) of the main camera (34)
Figure 2G:
FIG. 2G shows a binary quality map obtained from the selected pixel ($u_m, v_m$), in the quality map determination step (Step I in FIG. 2A)
Figure 2H:
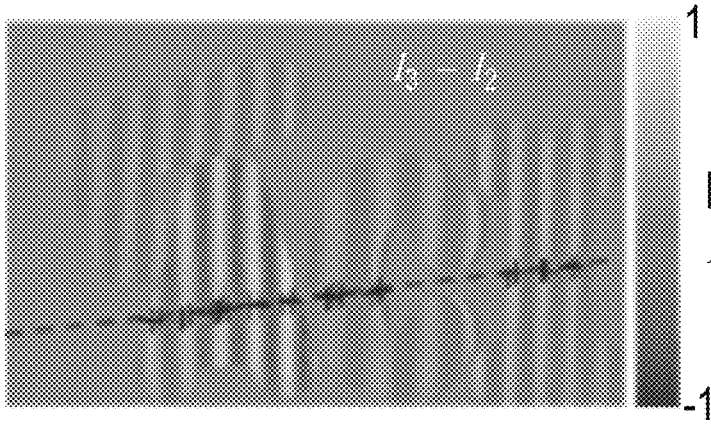
FIGS. 2H-2I show candidates that satisfy intensity matching condition and constraints, with the intensity profile of $I_3-I_2$ along the epipolar line (39)
Figure 2I:
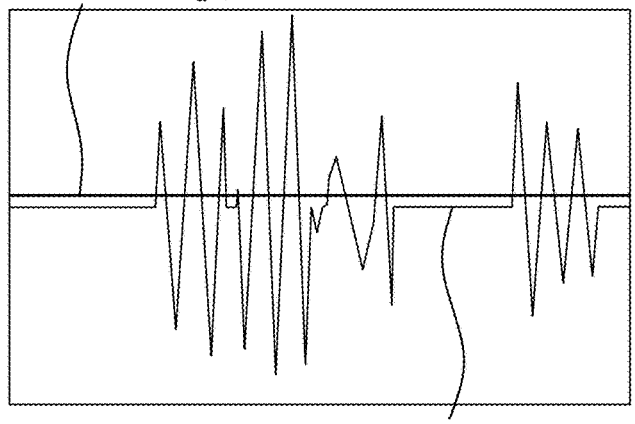
Figure 2J:
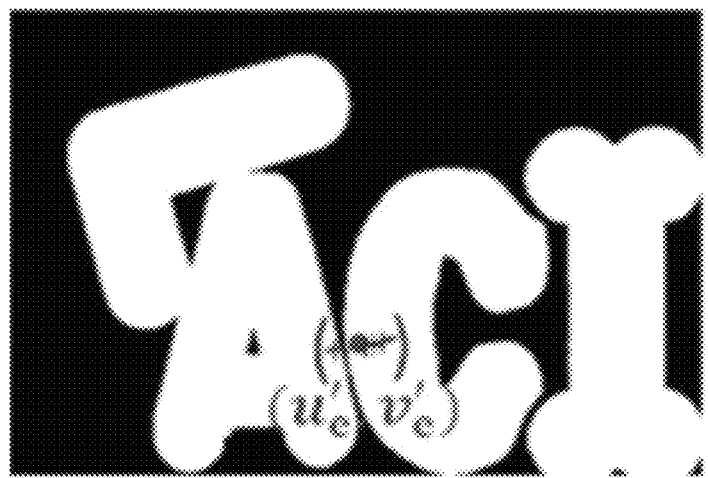
FIG. 2J shows the determined segment of the epipolar line (39) for the candidates (37) in the quality map of the auxiliary camera (36)
Figure 2K:
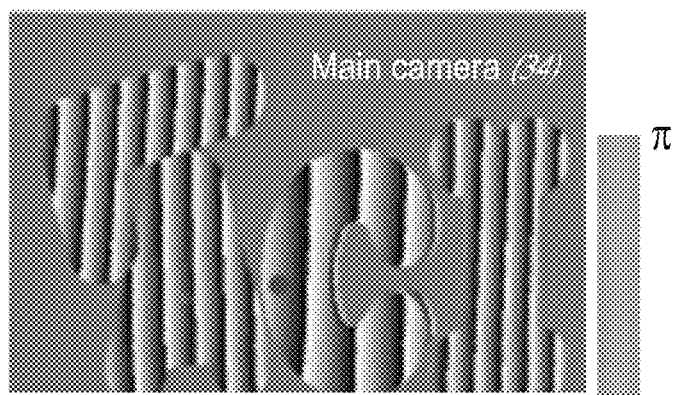
FIGS. 2K-2L show a constraint of same sign of the wrapped phases of the selected point and on the candidate, in the candidate discovery step (see Step II in FIG. 2A')
Figure 2L:
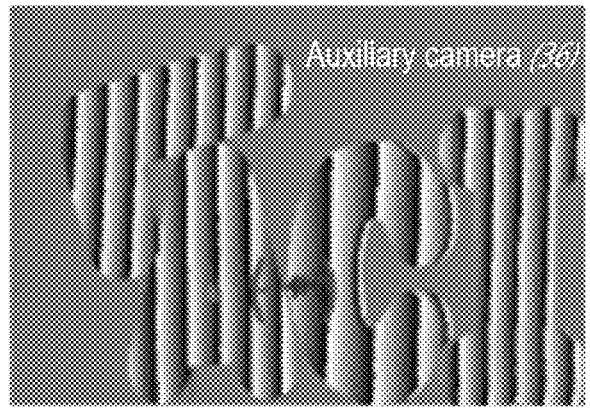
Figure 2N:
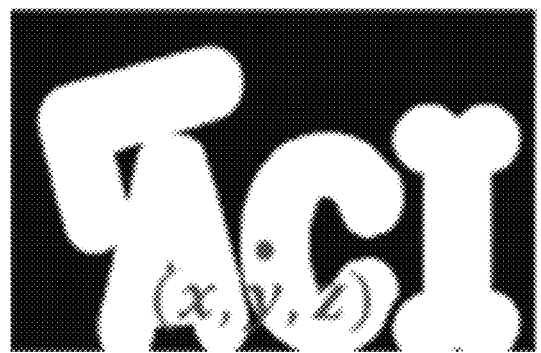
FIG. 2N shows the 3D point (x, y, z) recovered in the 3D point recovery step (Step IV in FIG. 2A''')

Relation (3) allows analyzing two types of intensity matching conditions for the order of pattern projection shown in FIG. 1B. For a pixel $(u'_a, v'_a)$ in the images of the auxiliary camera 36 that perfectly corresponds with the coordinates of a selected pixel $(u_m, v_m)$ in the images of the main camera 34, Relation (3) yields:

$$I_0(u_m, v_m) + I_2(u'_a, v'_a) = I_1(u_m, v_m) + I_3(u'_a, v'_a). \quad (4)$$

Rearrangement of Relation (4) leads to the equivalent relation, selected as the intensity matching condition:

$$I_0(u_m, v_m) - I_1(u_m, v_m) = I_3(u'_a, v'_a) - I_2(u'_a, v'_a). \quad (5)$$

Each side of Relation (5) contains images captured by the same camera and represent a residual fringe component of sinusoidal characteristics, which allows to increase the efficiency of line-constrained searches by regularizing local maxima and minima in the patterns and by including additional phase information. Moreover, by considering the right-hand side as a continuously varying function along the epipolar line (39) determined on the calibrated auxiliary camera 36, Relation (5) and bi-linear interpolation allows for the selection range 41 of discrete candidates 37 with sub-pixel accuracy.

FIG. 2 is a flowchart of a method for coordinate-based 3D point determination according to an aspect of the present disclosure, with coordinates of the point to be matched for the main camera4 $(u_m, v_m)$; coordinates of the estimated corresponding point for the auxiliary camera $(u'_e, v'_e)$ 42; recovered 3D coordinates (x, y, z); horizontal distance between the candidates and the estimated corresponding point $r_i$; phase value of the selected point in the main camera obtained by the Fourier transform profilometry method $\omega_m$; phase value of the candidate points in the auxiliary camera obtained by the Fourier transform profilometry method; phase value obtained by the phase-shifting method $\varphi'_{ai}$; phase value determined on the projector's plane $\varphi''_{pi}$; 3D points determined by candidates $P_i$; principal point of the main camera $P_m$; principal point of the auxiliary camera $P_a$; $\Delta I_m = I_0(u_m, v_m) - I_1(u_m, v_m)$; and intensity profile of $I_3 - I_2$ along the epipolar line $\Delta I_{ep}$.

In a quality map determination step (see Step I 40 in FIG. 2), $(I_0+I_1)/2$ 42 and $(I_2+I_3)/2$ 44 are obtained from images by the main camera 34. Then, a threshold intensity, obtained from a selected background region, is used to eliminate pixels with low intensities and obtain a binary quality map. Subsequently, after such thresholding of the intensity map, only pixels $(u_m, v_m)$ 46 that fall within the quality map of the main camera 34 are considered for 3D information recovery.

In a candidate discovery step (see Step II 48 in FIG. 2), the selected pixel $(u_m, v_m)$ of the main camera 34 determines an epipolar line 50 containing the matching point within the images of the auxiliary camera 36. Then, the candidates $(u'_{ai}, v'_{ai})$ for the matching point in the auxiliary camera 36 images are extracted, the subscript "i" denoting the $i^{th}$ candidate, that satisfy the intensity matching condition determined by Relation (5) above in addition to a quality map constraint 52, a transformation constraint 54 and a phase sign constraint 56.

The quality map constraint 52 requires that the candidates $(u'_{ai}, v'_{ai})$ for the matching point in the auxiliary images fall within the quality map of the auxiliary camera 36.

The transformation constraint 54 requires that candidates occur within a segment of the epipolar line 50 determined by a fixed two-dimensional projective transformation or homography that approximates the location of the matching point $(u'_e, v'_e)$ 58 within the images of the auxiliary camera 36 as follows:

$$s'[u'_e, v'_e, 1]^T = H[u_m, v_m, 1]^T, \quad (6)$$

where $s'$ is a scalar factor representing extraction of the pair of coordinates of the estimated corresponding point $(u'_e, v'_e)$ 58 from its homogeneous coordinates $[x, y, z, 1]^T$. H is obtained by applying Relation (6) to four points chosen as the corners of a flat rectangular plane when imaged by both cameras 34, 36 at the approximate center of the measurement volume. $[u_m, v_m, 1]^T$ are the homogeneous coordinates of the selected pixel $(u_m, v_m)$ of the main camera 34. Once the coordinates of the estimated corresponding point $(u'_e, v'_e)$ 58 are determined, the search along the epipolar line is confined to the segment occurring over the horizontal interval $[u'_e - r_0, u'_e + r_0]$, where $r_0$ is an experiment-dependent constant. In general, $r_0$ is selected as small as possible while still covering the targeted depth range. For the presently described experiments, the value of $r_0$ was set to 40 pixels.

The phase sign constraint 56 requires that the selected point $(u_m, v_m)$ 60 of the main camera 34 and candidates $(u'_{ai}, v'_{ai})$ 62 have the same sign of their wrapped phases 64 $\omega_m$ and $\omega'_{ai}$ respectively. Estimates of the wrapped phases 64 are obtained using Fourier transform profilometry. In particular, the intensity $I_f(u_m, v_m)$ of the selected pixel $(u_m, v_m)$ of the main camera pixel in the filtered image is obtained by band-pass filtering the left-hand side of Relation (5) $I_0 - I_1$, as follows:

$$I_f(u_m, v_m) = \frac{\sqrt{2}}{2} I_{va}(u_m, v_m) \exp\left[j\left(\varphi(u_m, v_m) + \frac{\pi}{4}\right)\right]. \quad (7)$$

The wrapped phase estimation $\omega_m$ of the selected point $(u_m, v_m)$ is obtained as follows:

$$\omega_m = \tan^{-1}\left\{\frac{\Im[I_f(u_m, v_m)]}{\Re[I_f(u_m, v_m)]}\right\}, \quad (8)$$

where $\Im[\cdot]$ and $\Re[\cdot]$ denote the imaginary and real part of a complex variable respectively. The same band-pass filtering applied to the right-hand side of Relation (5) $I_3-I_2$ yields the estimate of its wrapped phase 64 $\omega'_{ai}$ of the candidate $(u'_{ai}, v'_{ai})$, as follows:

$$\omega'_{ai} = \tan^{-1}\left\{\frac{\Im[I'_f(u'_{ai}, v'_{ai})]}{\Re[I'_f(u'_{ai}, v'_{ai})]}\right\}. \quad (9)$$

The phase sign constraint requires that the wrapped phase estimation $\omega_m$ of the selected point $(u_m, v_m)$ and the wrapped phase estimation $\omega'_{ai}$ of the candidate $(u'_{ai}, v'_{ai})$ have the same sign in the interval $(-\pi, \pi]$.

Other Fourier transform profilometry methods for wrapped phase value extraction.

The output of the candidate discovery step 48 is a pool of candidates for further evaluation and the method proceeds to matching point selection 66. If no candidate is found, the candidate discovery step 48 is re-initiated for the next pixel in the main camera 34, until a candidate 62 is obtained, and the method proceeds to the matching point selection 66.

In the matching point selection step (see Step III 66 in FIG. 2), penalty scores 68 for each candidate 62 obtained from the candidate discovery step 48 are determined. A first and primary criterion compares the phase values of the candidates using two methods. First, the phase of the candidate 62 is obtained from the intensities of the candidate $(u'_{ai}, v'_{ai})$ and of the pixel $(u_m, v_m)$ of the selected point 60 as follows:

$$\varphi'_{ai} = \tan^{-1}\left[\frac{I_1(u_m, v_m) - I_3(u'_{ai}, v'_{ai})}{I_0(u_m, v_m) - I_2(u'_{ai}, v'_{ai})}\right]. \quad (10)$$

Meanwhile, for each candidate $(u'_{ai}, v'_{ai})$ 62, the coordinate triple $(u_m, v_m, u'_{ai})$ and knowledge of camera calibration allows determining an estimated 3D point $P_i$ by using the stereo vision method. In addition, with the knowledge of the projector calibration, a point with coordinates $(u''_{pi}, v''_{pi})$ on the plane of the projector 30 is determined for each candidate. Then, an unwrapped phase value $\varphi''_{pi}$ is obtained by:

$$\varphi''_{pi} = \frac{2\pi}{p}(u''_{pi} - u''_d), \quad (11)$$

where $u''_d$ is a horizontal datum coordinate on the plane of the projector associated with the zero phase, and p is the fringe period in units of projector pixels. Since these independently obtained phase values must agree if the candidate correctly matches $(u_m, v_m)$, a penalty score $A_i$ 70, as a normalized difference of these two phase values, is obtained as follows:

$$A_i = \frac{|R(\varphi'_{ai} - \varphi''_{pi})|}{\pi}, \quad (12)$$

where the rewrapping function $R(\cdot)$ computes the subtracted difference between wrapped and unwrapped phase values.

To improve the robustness of the method, two additional criteria are implemented using data available from the candidate discovery step. $B_i$ 72 is a normalized distance score favoring candidates located closer to the estimated matching point $(u'_e, v'_e)$, which is obtained by:

$$B_i = \frac{|u'_e - u'_{ai}|}{r_0}. \quad (13)$$

Moreover, $C_i$ 74 is a normalized difference of wrapped phase values obtained by using the wrapped phases $\omega_m$ and $\omega'_{ai}$, as follows:

$$C_i = \frac{|R(\omega_m - \omega'_{ai})|}{\pi}. \quad (14)$$

A total penalty score $S_i$ 76 for each candidate is then determined as a weighted linear combination of three individual scores as follows:

$$S_i = \eta_1 A_i + \eta_2 B_i + \eta_3 C_i, \quad (15)$$

where the normalized weights $[\eta_1, \eta_2, \eta_3] = [0.73, 0.09, 0.18]$ are empirically selected to lead to the results that are most consistent with physical reality. Finally, the candidate with the minimum total penalty score $S_i$ is selected as the matching point $(u'_a, v'_a)$, and its phase values are obtained by using relations. (10) and (11) are denoted as $\varphi'_a$ and of $\varphi''_p$, respectively.

In a final step of 3D point recovery (see Step IV 78 in FIG. 2), the method determines the final 3D coordinates 80. First, the phase of the candidate $\varphi'_a$ is unwrapped as $\varphi'_a + 2\pi q$, where q is an integer such that $\varphi''_p - (\varphi'_a + 2\pi q) \in (-\pi, \pi]$. Then, the coordinate on the plane of the projector $u''_p$ is obtained with sub-pixel resolution as follows:

$$u''_p = u''_d + P(\varphi'_a/2\pi + q), \quad (16)$$

from which the final 3D coordinates (x, y, z) 80 are obtained using calibration information associated with the coordinate triple $(u_m, v_m, u''_p)$.

Results

Figure 3A:
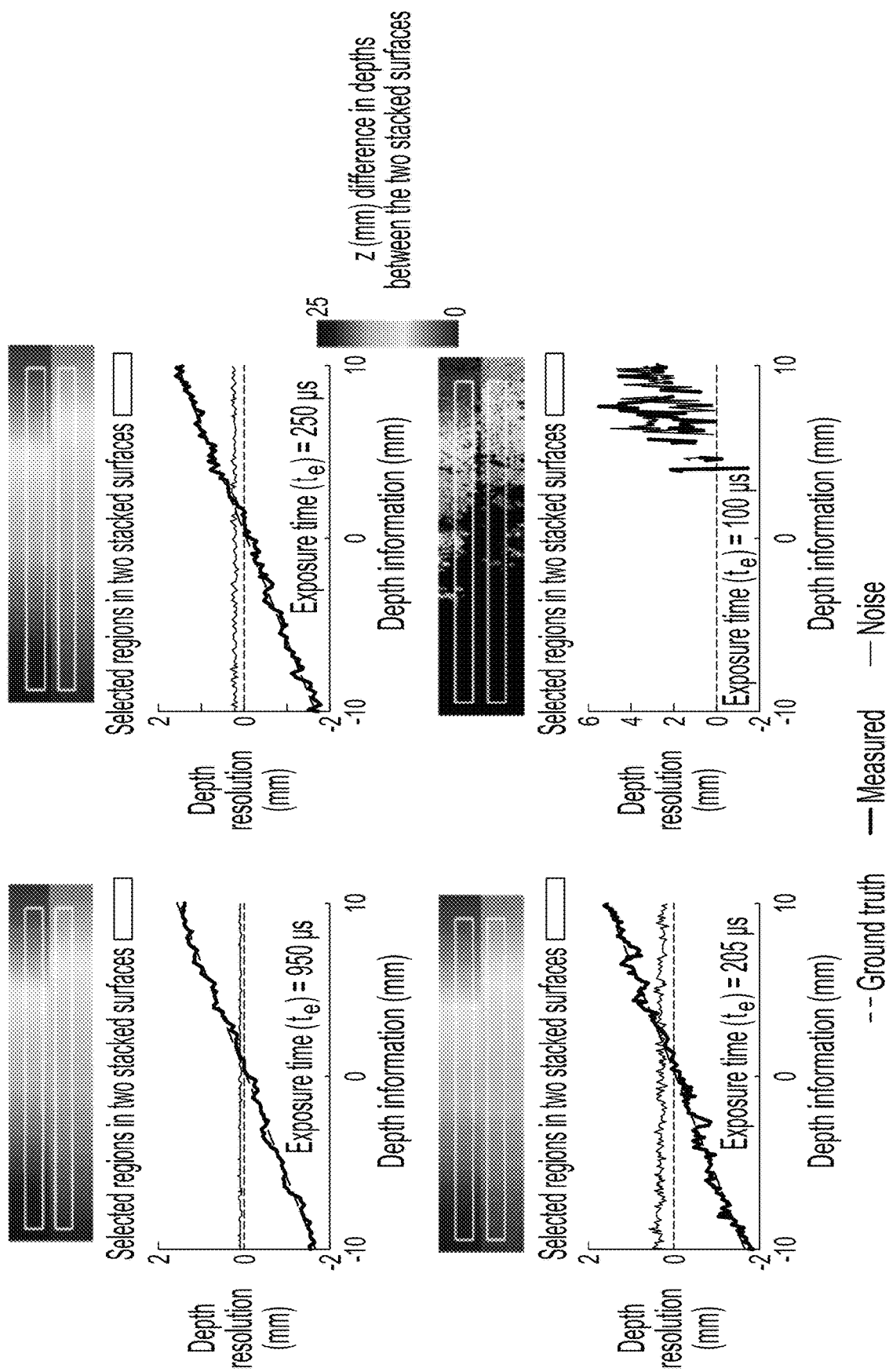
FIG. 3A shows 3D images of the planar surfaces (top images) and measured depth difference (bottom images) at different exposure times $t_e$=950 µs, $t_e$=250 µs $t_e$=205 µs and $t_e$=100 µs, the boxes in full lines in the top and bottom images representing the selected regions for analysis, with depth information on the x axis obtained by averaging the depth values along the y axis; the noise being defined as the averaged values of the standard deviation in depth from both surfaces; the depth resolution being defined as when $z_d$.
Figure 3B:
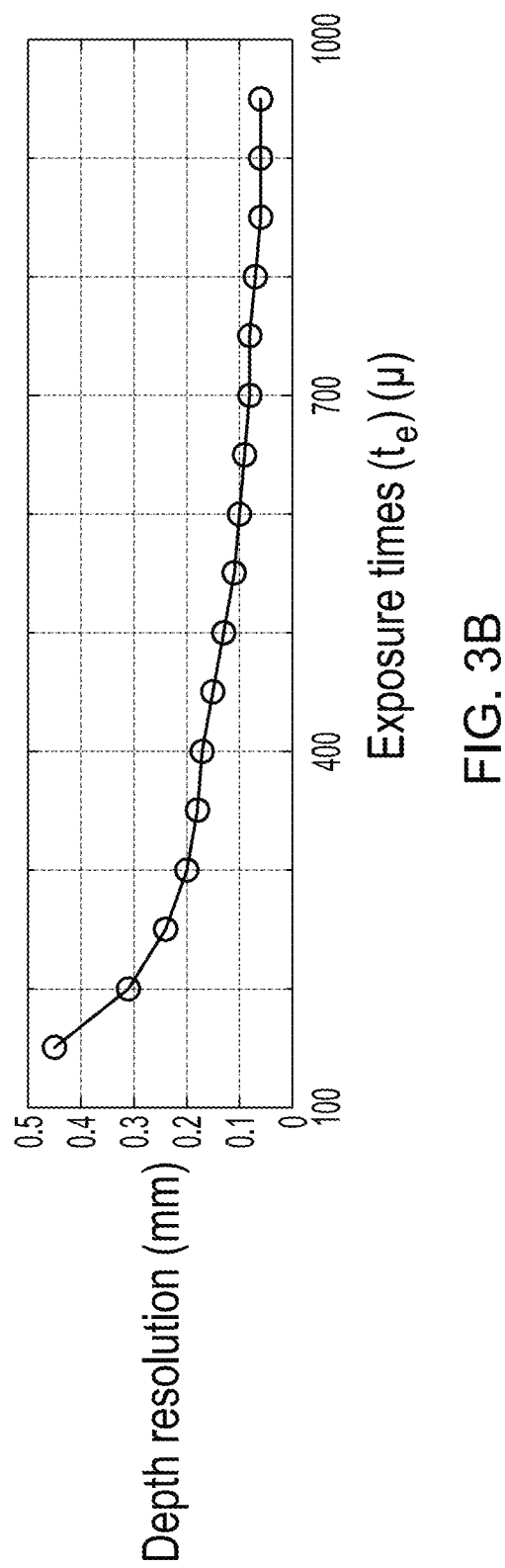
FIG. 3B shows depth resolution versus exposure time $t_e$.

FIGS. 3A and 3B show quantification of the depth resolution of the method. To quantify the depth resolution with different exposure times, two stacked planar surfaces offset by about 9° were imaged. Reconstructed results at four representative exposure times $t_e$ (illustratively 950 μs, 250 μs, 205 μs and 100 μs) are shown in FIG. 3A. One area on each surface 82, marked as white boxes 84 in full lines in FIG. 3A, was selected in the reconstructed image. The depth information on the x axis was obtained by averaging the depth values along the y axis. The difference in depths between these two surfaces is denoted by $z_d$. In addition, the noise 86 is defined as the averaged values of the standard deviation in depth from both surfaces. The depth resolution 88 is defined as when $z_d$ equals to two times the noise level of the system. As shown in the four plots of FIG. 3A, the reconstruction results deteriorate with shorter exposure times, manifested by increased noise levels and more points incapable of retrieving 3D information. As a result, the depth resolution degrades from 0.06 mm at $t_e$=950 μs to 0.45 mm at $t_e$=150 μs (FIG. 3B). At exposure time $t_e$=100 μs, the method fails in 3D measurements. The region of unsuccessful reconstruction prevails across most of the planar surfaces. The noise 86 dominates the obtained depth difference, which is attributed to the low signal-to-noise ratio in the captured images.

Figure 4A:
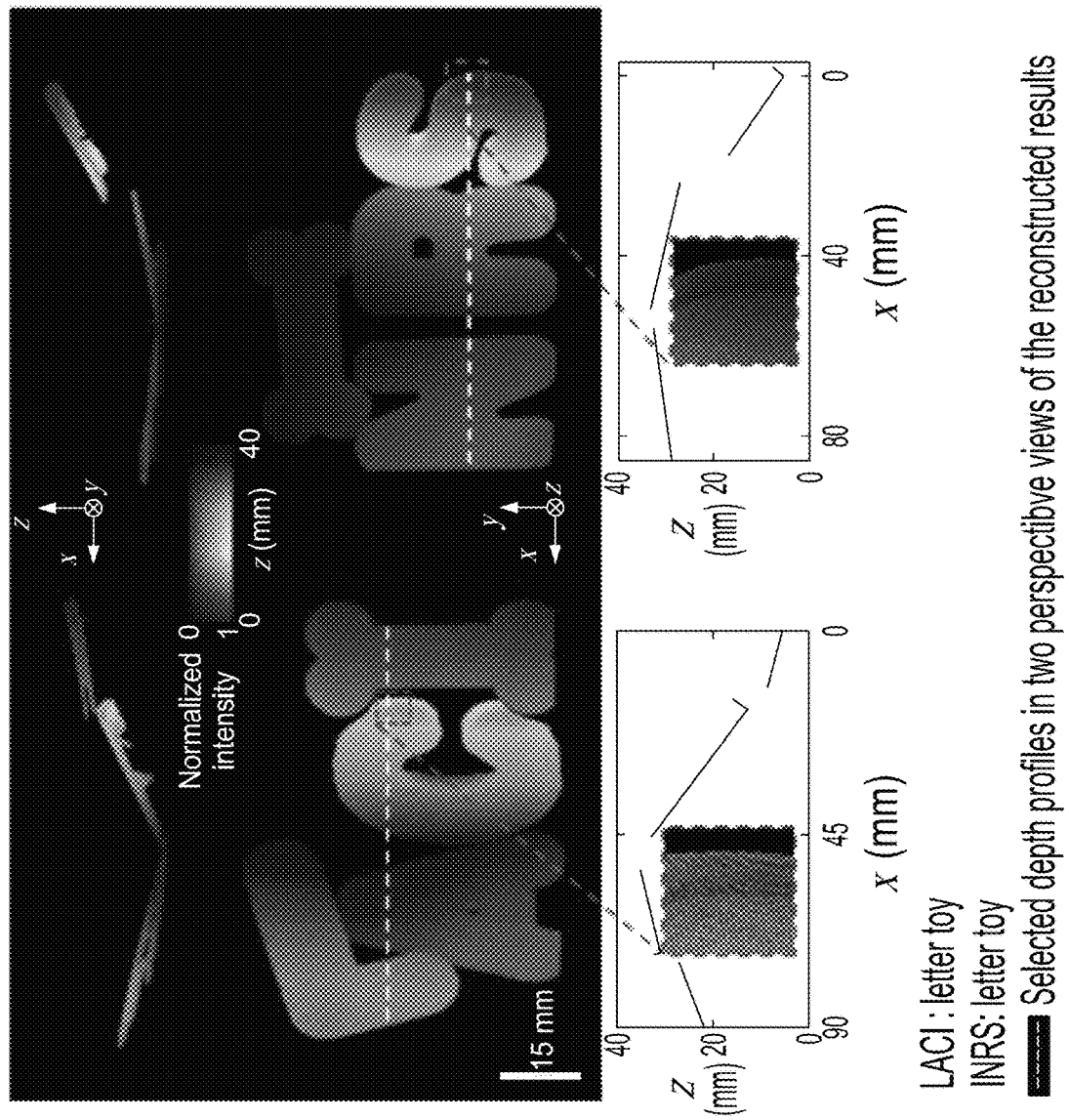
FIG. 4A shows reconstructed results of letter toys "LACI" and "INRS" (bottom row), with two perspective views (top row) at selected depth profiles marked by dashed lines and close-up views in bottom inserts.
Figure 4B:
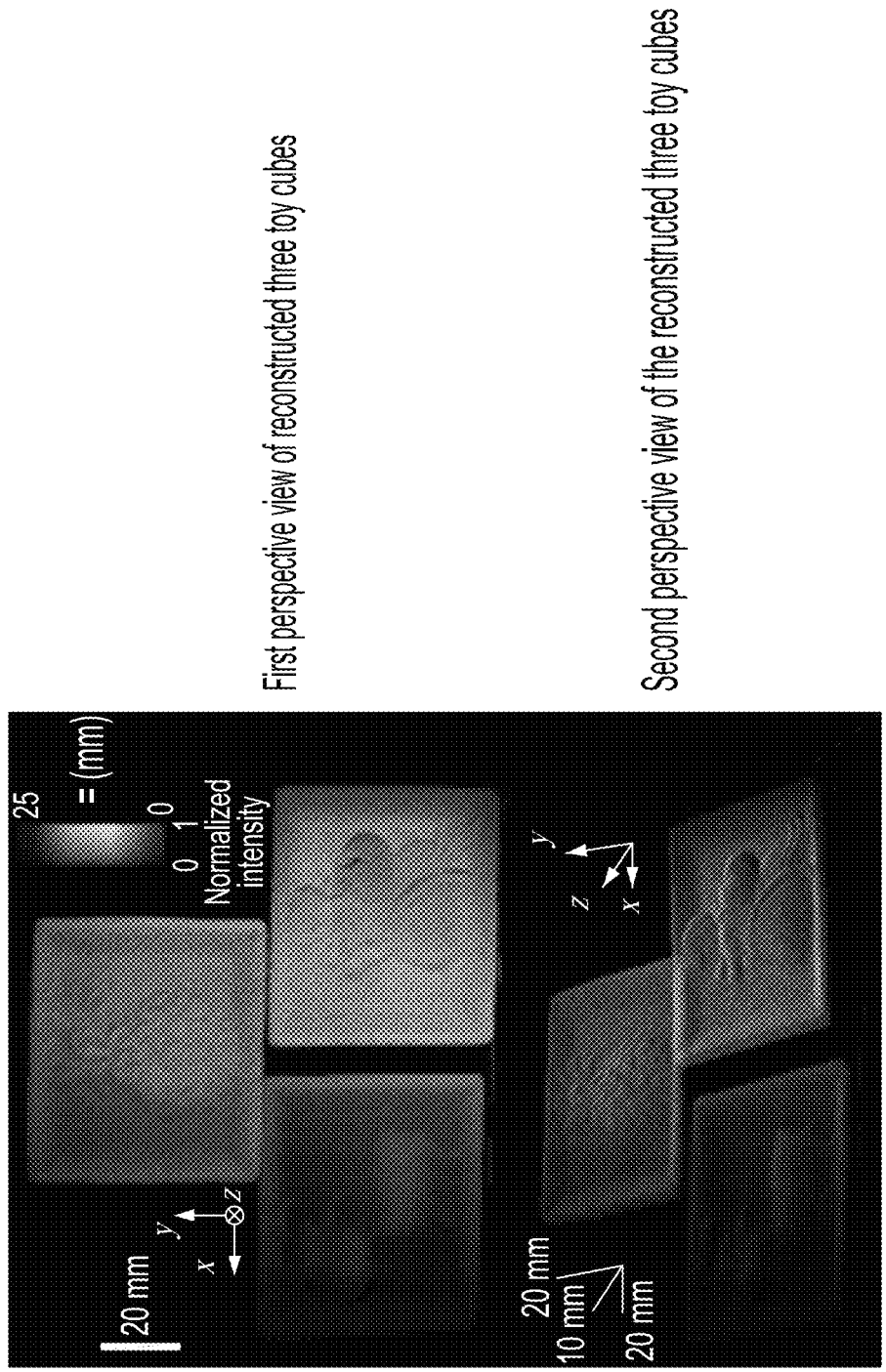
FIG. 4B shows two perspective views of the reconstruction results of three toy cubes with surface structures of a depth of about 4 mm.

To examine the feasibility of the method, various static 3D objects were imaged. First, two sets of 3D distributed letter toys 90 that composed the words of "LACI" 92 and "INRS" 94 were imaged. FIGS. 4A and 4B show static 3D objects. Shown in FIG. 4A, the two perspective views of the reconstructed results reveal the 3D position of each letter toy 90. The detailed surface structures are illustrated by the selected depth profiles (white dashed lines in FIG. 4A). A proof-of-concept experiment was also conducted on three cube toys 96 with fine structures, with a depth of about 4 mm, on the surfaces. As can be seen in FIG. 4B, the detailed structural information of these cube toys 96 is recovered.

Imaging of Dynamic 3D Objects

Figure 5A:
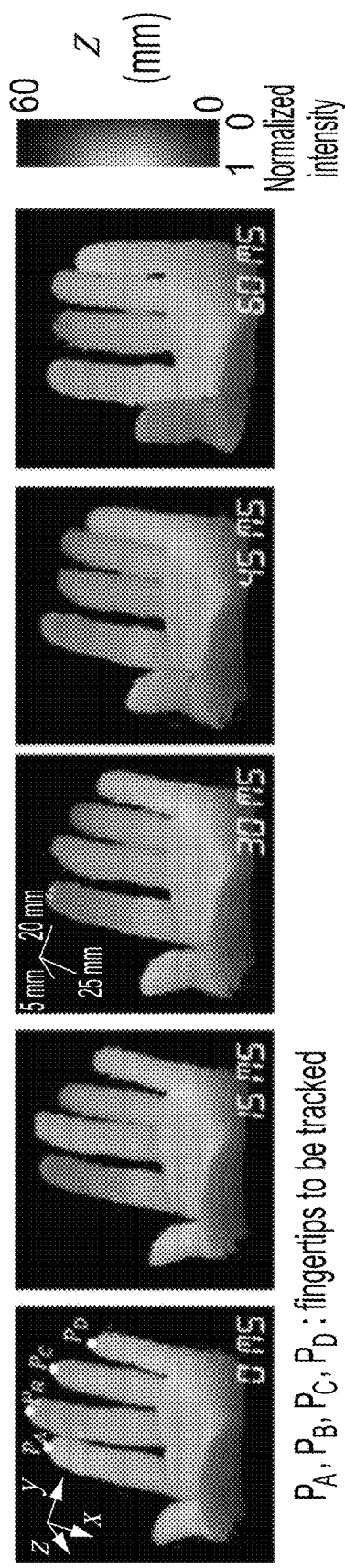
FIG. 5A shows reconstructed 3D images of a moving hand at five time points $P_A, P_B, P_C$ and $P_D$ from 0 ms to 60 ms with a time interval of 15 ms.
Figure 5B:
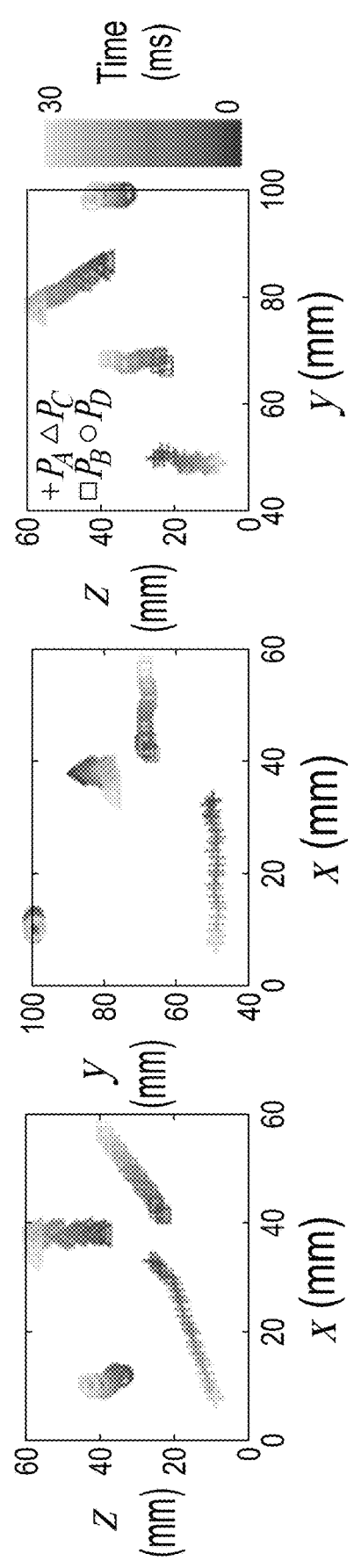
FIG. 5B shows movement traces of the points $P_A, P_B, P_C$ and $P_D$ marked in the first panel in FIG. 5A.

To verify high-speed 3D surface profilometry, the method was used to image two dynamic scenes: a moving hand (FIG. 5A) and three bouncing balls (FIG. 5B). The fringe patterns were projected at 4 kHz. The exposure times of both cameras were $t_e$=250 μs. Under these experimental conditions, a 3D imaging speed of 1 thousand frames per second (kfps), a field of view (FOV) of 150 mm×130 mm, corresponding to 1180×860 pixels in captured images, and a depth resolution of 0.24 mm were achieved.

FIG. 5A shows the reconstructed 3D images 98 of the moving hand at five time points from 0 ms to 60 ms with a time interval of 15 ms. The high-speed 3D imaging allowed tracking the movements of four fingertips 100. As shown in FIG. 5B, all the four fingers have apparent movement in both the x axis and the z axis but stay relatively stationary in the y axis, which agrees with the experimental condition.

Figure 5C:
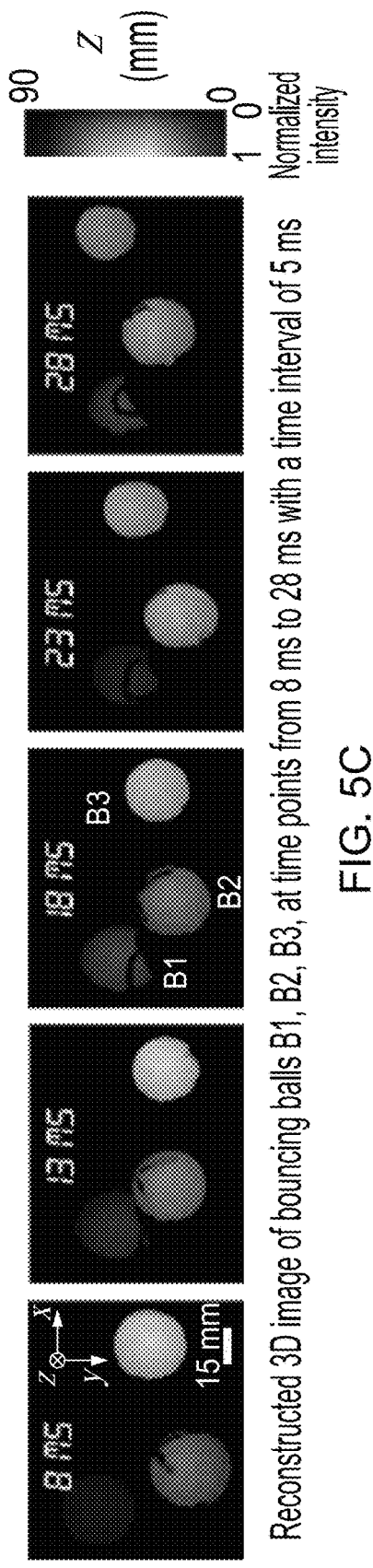
FIG. 5C shows reconstructed 3D images, at different time points from 8 ms to 28 ms with a time interval of 5 ms, of three bouncing balls $B_1, B_2$ and $B_3$.
Figure 5D:
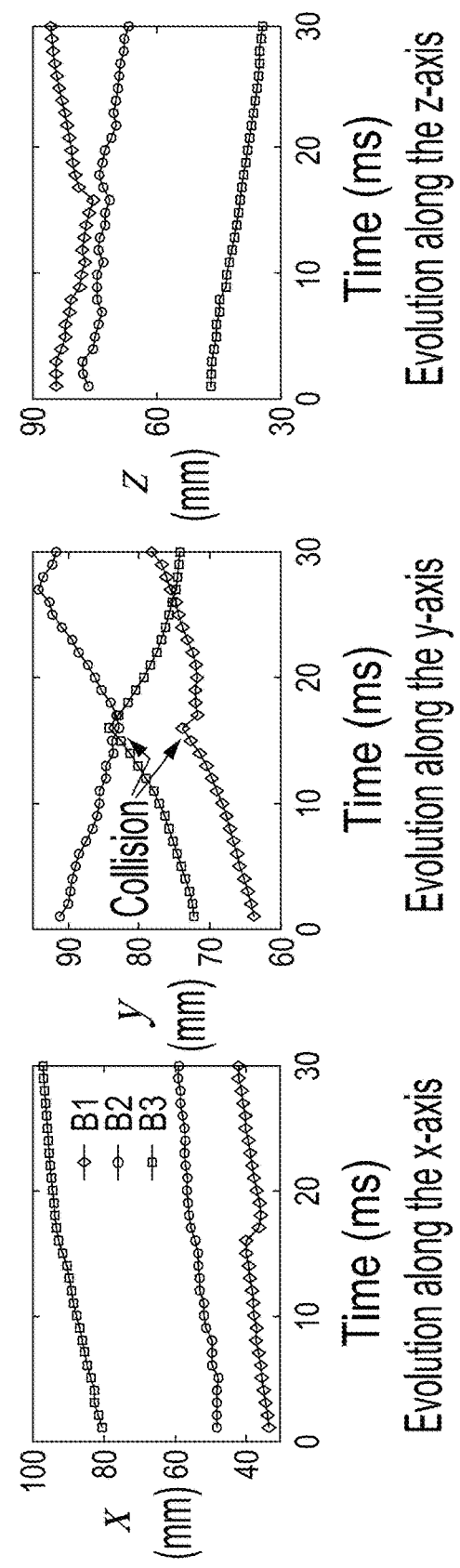
FIG. 5D shows the evolution of 3D positions of the bouncing balls $B_1, B_2$ and $B_3$, marked in the third panel in FIG. 5C, along the x-axis (left handside panel), y-axis (middle panel), and z-axis (right handside panel)

In the second experiment, three white balls 102, each of which was marked by a different letter on its surface, bounced in an inclined transparent container. FIG. 5C shows five representative reconstructed images 104 from 8 ms to 28 ms with a time interval of 5 ms. The changes of the letter "C" 106 on $B_1$ and the letter "L" 108 on $B_2$, marked in the third panel 110 of FIG. 5C, clearly show the rotation of the two balls. The method enabled tracking the 3D centroids of each ball 102 over time. As shown in FIG. 5D, $B_1$ collides with $B_2$ at 16 ms, resulting in a sudden change in the moving directions. This collision temporarily interrupted the free fall of $B_1$, represented by the two turning points in the curve of evolution along the y-axis (second panel 112 of FIG. 5D). The collision also changed the moving direction of $B_2$, making it touch the base at 27 ms and then bounce up. In this scene, $B_3$ maintained its movement in a single direction in both the x axis and the z axis. It fell onto the based and bounced back at 16 ms, resulting in a turning point in its y-t curve. Because of the inclined bottom plane, the y-value of $B_3$ at 16 ms was smaller than that of $B_2$ at 27 ms.

Application to the Study of Sound-Induced Vibration on Glass

To highlight the broad utility of the method, sound-induced vibration on glass cup 114 was imaged. In an experiment (FIG. 6A), the glass cup 114 was fixed on a table 116. A function generator drove a speaker 118 to produce single-frequency sound signals, from 450 Hz to 550 Hz with a step of 10 Hz through a sound channel 120 placed close to the-wall of the cup 114. To image the vibration dynamics, fringe patterns were projected at 4.8 kHz. The cameras had an exposure time of $t_e$=205 μs. This configuration enabled a 3D imaging speed of 1.2 kfps, a field of view (FOV) of 120 mm×110 mm, corresponding to 960×800 pixels in captured images, and a depth resolution of 0.31 mm. FIG. 6B shows four representative 3D images 122 of the instantaneous shapes of the glass cup 114 driven by the 500-Hz sound signal, showing the dynamic of structural deformation of the glass cup 114. The evolution of depth changes was analyzed using five selected points, marked by $P_A$ to $P_E$ in the first panel 124 of FIG. 6B. A shown in FIG. 6C, the depth changes of the five points $P_A$ to $P_E$ are in accordance, which is attributed to the rigidness of the glass cup 114.

Time histories of averaged depth displacements under different sound frequencies were further analyzed. FIG. 6D shows the results at the driving frequencies of 490 Hz, 500 Hz, and 510 Hz. Each result was fitted by a sinusoidal function with a frequency of 490.0 Hz, 499.4 Hz, and 508.6 Hz, respectively. These results show that the rigid glass cup 114 vibrated in compliance with the driving frequency. Moreover, the amplitudes of fitted results, $\Delta z_{fit}$, were used to determine the relationship between the depth displacement and the sound frequency (FIG. 6E). This result was fitted by the Lorentz function, which determined the resonant frequency of this glass cup 114 to be 499.0 Hz.

Application to the Study of Glass Breakage

To further apply the method to recording non-repeatable 3D dynamics, the process of a glass cup 114 breaking by a hammer was imaged. As displayed in FIG. 7A, the growth of cracks 126 and the burst of fragments 128 with different shapes and sizes were clearly shown in the reconstructed 3D images. The time courses of velocities of four fragments 128, marked by $F_A$ to $F_D$ in FIG. 7A, are plotted in FIG. 7B. The velocities in the y axis are considerably small compared to the other two directions, which indicates the impact of the hammer force was exerted on the x-z plane. $v_y$ of fragments $F_A$ and $F_C$ shows that they moved upward until 15 ms and fell afterward. $v_y$ of fragments $F_B$ and $F_D$ reveals that they fell onto the remaining base of the cup at 15 ms and kept sliding down on the surface. The data of $v_z$ illustrates that $F_A$ and $F_C$ moved closer to the cameras, which were directly driven by the hammer's force. However, $F_B$ and $F_D$, which collided with other pieces, maintaining their positive directions in $v_z$ to move away from the cameras. The corresponding accelerations are displayed as in FIG. 7C, which indicates the influence of both the main strike and the ensuing collision among different fragments. At 14 ms, the collision with other fragments, which applied an impact along the +x direction, dominated the acceleration direction for all four tracked fragments. In contrast, at 15 ms, another collision produced an impact in the −x direction, causing a sharp decrease in the acceleration for $F_A$ and $F_C$. In addition, the direction of acceleration for $F_D$ along the y-axis changed several times, which is attributed in several collisions of $F_D$ with the base of the glass cup 114 while sliding down.

Referring back to FIG. 1A, there is thus presented a method with a kfps-level 3D imaging speed over a field of view of up to 150 mm×130 mm. The method implements temporally interlaced acquisition in multi-view 3D phase-shifting fringe projection profilometry systems, which allows each camera 34, 36 capturing half of the sequence of phase-shifting fringes. Leveraging the characteristics indicated in the intensity matching condition [Relation (5)], the method applies constraints in geometry and phase to find the matching pair of points in the main 34 and auxiliary 36 cameras and guides phase unwrapping to extract the depth information. The method was shown to allow the 3D visualization of glass vibration induced by sound and the glass cup breakage by a hammer.

Still referring to FIG. 1A there is thus presented a system and a method for high-speed dual-view band-limited illumination profilometry using temporally interlaced acquisition.

As people in the art will now be in a position to appreciate, temporally interlaced acquisition eliminates the redundant capture of fringe patterns in data acquisition. The roles of the main camera 34 and the auxiliary camera 36 are interchangeable and the present method may be adapted to a range of multi-view phase-shifting fringe projection profilometry systems. Moreover, temporally interlaced acquisition reduces the workload for both cameras by half. For the given bandwidth of the camera's interface, this more efficient use of cameras can either increase the 3D imaging speed for a fixed field of view or enlarge the field of view with a maintained 3D imaging speed. Both advantages shed light on implementing the present method with an array of cameras to simultaneously accomplishing high accuracy and high speed 3D imaging over a larger fields of view. Also, the two cameras 34, 36 deployed in the present method are placed on a same side relative to the projector 30, which circumvents the intensity difference induced by the directional scattering light from the 3D object and reduces shadow effect by occlusion occurring when placing the cameras on different sides of the projector. As a result, robust pixel matching in the image reconstruction algorithm allows to recover 3D information on non-Lambertian surfaces.

In an alternative embodiment, the imaging speed and field of view may be optimized by separating the workload to four cameras, by using a faster digital micromirror device 18, and by using a more powerful laser 10. The image reconstruction toward real-time operation may be increased by further adapting the 3D point recovery method to four cameras and by using parallel computing to accelerate the calculation.

Still referring to FIG. 1A, the present method may be integrated in structured illumination microscopy and frequency-resolved multi-dimensional imaging. The present method may also be implemented in the study of the dynamic characterization of glass in its interaction with the external forces in non-repeatable safety test analysis. As another example, the present method may be used to trace and recognize the hand gesture in 3D space to provide information for human-computer interaction. Furthermore, in robotics, the present method may provide a dual-view 3D vision for object tracking and reaction guidance. Finally, the present method can be used as an imaging accelerometer for vibration monitoring in rotating machinery and for behavior quantification in biological science.

Still referring to FIG. 1A, temporally interlaced acquisition thus integrated in a dual-view phase-shifting fringe projection profilometry system allows each camera 34, 36 capturing half of the sequence of phase-shifting fringes 31. Leveraging the characteristics indicated in the intensity matching condition, the method applies constraints in geometry and phase to find the matching pair of points in the main and auxiliary cameras and guides phase unwrapping to extract the depth information.

Still referring to FIG. 1A, the present method and system eliminate the redundant capture of fringe patterns in data acquisition, which lifts the long-standing limitation in imaging speed for multi-view phase-shifting fringe projection profilometry, and allows reducing the workload of cameras, which enables the enhancement of either the 3D imaging speed or the imaging field of view. Dynamic 3D imaging of over 1 thousand frames per second on a field of view of up to 150×130 mm$^2$, corresponding to 1180×860 pixels in captured images, was demonstrated. Moreover, by putting the two cameras 34, 36 side by side on a same did-side of the projector 30, the present method and system circumvent the influence of directional scattering light and occlusion effect for more robust reconstruction, thereby expanding the application range of multi-view phase-shifting fringe projection profilometry to non-Lambertian surfaces.

Still referring to FIG. 1A, the present method and system may be adapted into other multi-view 3D profilometers, thus opening new opportunities to blur-free 3D optical inspection and characterization with high speeds, large fields of view, and high accuracy. The present method and system provide a versatile tool for dynamic 3D metrology with potential applications in advanced manufacturing, such as characterization of glass in non-repeatable safety test and high-speed vibration monitoring in rotating machinery. The present compact and symmetric system may be embedded in the vision system of robots to track objects, to recognize the gesture for human-computer interaction, and to guide reactions.

The scope of the claims should not be limited by the embodiments set forth in the examples, but should be given the broadest interpretation consistent with the description as a whole.

The invention claimed is:

1. A method for 3D imaging of an object, comprising:
projecting sinusoidal fringe patterns onto the object using a projecting unit and capturing fringe patterns deformed by the object, alternatively by at least a first camera and a second camera, and
recovering a 3D image of the object pixel by pixel from mutually incomplete images provided by the first camera and the second camera, by locating a point in images of the second camera that matches a selected pixel of the first camera; determining estimated 3D coordinates and wrapped phase based on calibration of the cameras, determining an horizontal coordinate on the plane of a projector of the projecting unit based on calibration of the projector, and using a wrapped phase value to recover a 3D point of 3D coordinates (x, y, z);
the method comprising calibrating the first and second cameras and the projecting optics, using images captured by the first camera to provide camera coordinates of a point on the object, and determining an epipolar line on the second camera, recovering an horizontal coordinate in images captured by the second camera along the epipolar line; by substituting the projector in place of the second camera, using intensity values of the camera coordinates of the point of the second camera across a sequence of images to recover information about a coordinate of the projector; and extracting 3D information of the object pixel by pixel based on interlaced image acquisition by incorporating the camera coordinates (u, v) of the point on the 3D object and its corresponding projector coordinates.

2. The method of claim 1, comprising calibrating the first and second cameras and the projecting optics, and recovering 3D information using a coordinate-based method, wherein, to the point on the object with the 3D coordinates (x, y, z) correspond two independent coordinates, (u, v) for the cameras and (u", v") for the projector.

3. The method of claim 1, comprising:
obtaining a threshold intensity from a selected background region in images captured by the first camera, using the threshold intensity to eliminate pixels in the images captured by the first camera to obtain a binary quality map of the first camera, and selecting a pixel in images of the second camera within the quality map of the first camera as a candidate; the selected pixel of the first camera determining an epipolar line containing the matching point within the images of the second camera, extracting candidates for the matching point in the second camera images that satisfy an intensity matching condition; determining penalty scores for each obtained candidate; and determining final 3D coordinates, by unwrapping the phase of the candidates and obtaining a coordinate on the plane of the projector.

4. The method of claim 1, comprising:
obtaining a threshold intensity from a selected background region in images captured by the first camera, using the threshold intensity to eliminate pixels in the images captured by the first camera to obtain a binary quality map of the first camera, and selecting a pixel in images of the second camera within the quality map of the first camera as a candidate; the selected pixel of the first camera determining an epipolar line containing the matching point within the images of the second camera, extracting candidates for the matching point in the second camera images that satisfy an intensity matching condition and quality map constraint, transformation constraint and phase sign constraint; the quality map constraint requiring that the candidates for the matching point in the second camera images fall within the quality map of the second camera; the transformation constraint requiring that the candidates occur within a segment of the epipolar line; and the phase sign constraint requiring that the selected point of the first camera and the candidates have a same sign of respective wrapped phases;
determining penalty scores for each obtained candidate; and determining final 3D coordinates, by unwrapping the phase of the candidates and obtaining a coordinate on the plane of the projector.

5. The method of claim 1, comprising positioning the cameras on a same side of the projector.

6. The method of claim 1, wherein the projection unit comprises a light source, a spatial light modulator, and a pattern conversion unit, the spatial light modulator generating sinusoidal fringes from beams from the light source using pre-defined binary patterns, and the pattern conversion unit converting the binary patterns to grayscale fringes; the cameras capturing alternatively deformed structured images; depth information being encoded into the phase of the deformed images, and the object being recovered by phase demodulation and reconstruction.

7. The method of claim 1, wherein the projection unit comprises a light source, a spatial light modulator and a pattern conversion unit, the spatial light modulator generating sinusoidal fringes from beams from the light source using pre-defined binary patterns, and the pattern conversion unit converting the binary patterns to grayscale fringes; the cameras capturing alternatively deformed structured images; depth information being encoded into the phase of the deformed images, and the object being recovered by phase demodulation and reconstruction, the light source being a high-coherent light source of a power of at least 50 mW, the cameras having an imaging speed of at least 2 k frames/second, and image resolution at least 1000×800 pixels, the spatial light modulator having a refreshing rate of at least 4 kHz and on board memory of at least 1 Mb, and the projector being selected with a focal length in a range between 18 and 55 mm, a F number in a range between 3.5 and 5.6, and a magnification ratio in a range between 5 and 10 times.

8. The method of claim 1, wherein the projection unit comprises a light source, a spatial light modulator, and a pattern conversion unit, the spatial light modulator generating sinusoidal fringes from beams from the light source using pre-defined binary patterns, and the pattern conversion unit converting the binary patterns to grayscale fringes; the cameras capturing alternatively deformed structured images; depth information being encoded into the phase of the deformed images, and the object being recovered by phase demodulation and reconstruction, the light modulator being one of: a digital micromirror device, a liquid crystal display and a binary fringe mask with a motorized translation stage, and the pattern conversion unit comprising a 4 f imaging system and a low-pass filter, with a ratio between a focal length of a first lens and a focal length of a second lens of the 4 f imaging system comprised in a range between 0.75 and 1.5, and a diameter of the low pass filter being selected in a range between 150 pm and 300 pm.

9. A method for 3D imaging of an object, comprising:
projecting sinusoidal fringe patterns onto the object using a projecting unit and capturing fringe patterns deformed by the object, alternatively by at least a first camera and a second camera, and
recovering a 3D image of the object pixel by pixel from mutually incomplete images provided by the first camera and the second camera, by locating a point in images of the second camera that matches a selected pixel of the first camera; determining estimated 3D coordinates and wrapped phase based on calibration of the cameras, determining an horizontal coordinate on the plane of a projector of the projecting unit based on calibration of the projector, and using a wrapped phase value to recover a 3D point of 3D coordinates (x, y, z);
the method comprising: obtaining a threshold intensity from a selected background region in images captured by the first camera, using the threshold intensity to eliminate pixels in the images captured by the first camera to obtain a binary quality map of the first camera, and selecting a pixel of an estimated corresponding pixel in images captured by the second camera within the quality map of the first camera; the selected pixel of the first camera determining an epipolar line containing a matching point within the images of the second camera, extracting candidates for the matching point in the second camera mages that satisfy an intensity matching condition.

10. The method of claim 9, comprising: determining penalty scores for each obtained candidate; and determining final 3D coordinates, by unwrapping the phase of the candidates and obtaining a coordinate on the plane of the projector.

* * * * *